(12) United States Patent
Kerzner

(10) Patent No.: US 9,494,936 B2
(45) Date of Patent: Nov. 15, 2016

(54) ROBOTIC ASSISTANCE IN SECURITY MONITORING

(71) Applicant: Alarm.com Incorporated, Vienna, VA (US)

(72) Inventor: Daniel Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/004,118

(22) Filed: Jan. 22, 2016

(65) Prior Publication Data

US 2016/0266577 A1 Sep. 15, 2016

Related U.S. Application Data

(60) Provisional application No. 62/132,494, filed on Mar. 12, 2015.

(51) Int. Cl.
*G05D 1/00* (2006.01)
*G08B 13/22* (2006.01)

(52) U.S. Cl.
CPC ............. *G05D 1/0022* (2013.01); *G08B 13/22* (2013.01)

(58) Field of Classification Search
CPC ..................... G05D 2201/0207; Y10S 901/01; Y10S 901/46; H04N 7/185; B64C 39/024
USPC ............ 701/2; 348/143, 152, 156, 154, 155, 348/144; 340/541, 5.2, 521, 531, 566, 340/426.13; 700/245, 259, 248; 901/1, 46
See application file for complete search history.

(56) References Cited

U.S. PATENT DOCUMENTS

| | | | |
|---|---|---|---|
| 4,857,912 A | 8/1989 | Everett | |
| 5,446,445 A * | 8/1995 | Bloomfield | ............ G08B 17/10 340/521 |
| 2003/0025599 A1* | 2/2003 | Monroe | ........... G08B 13/19602 340/531 |
| 2003/0069002 A1 | 4/2003 | Hunter | |
| 2005/0248444 A1* | 11/2005 | Joao | ...................... B60R 25/042 340/426.13 |

(Continued)

FOREIGN PATENT DOCUMENTS

JP 2010072831 A * 4/2010 ............. G08B 15/00

OTHER PUBLICATIONS

PCT Notification of the Transmittal of the International Search Report and the Written Opinion for International Application No. PCT/US2016/022361 dated May 26, 2016, 8 pages.

*Primary Examiner* — Marthe Marc-Coleman
(74) *Attorney, Agent, or Firm* — Fish & Richardson P.C.

(57) ABSTRACT

Methods, systems, and apparatus, including computer programs encoded on storage devices, for monitoring, security, and surveillance of a property. In one aspect, a system includes multiple robotic devices, multiple sensors, wherein the multiple sensors includes a first sensor, multiple charging stations, and a monitor control unit. The monitor control unit may include a network interface, one or more processors, and one or more storage devices that include instructions to cause the one or more processors to perform operations. The operations may include receiving data from the first sensor that is indicative of an alarm event, accessing information describing the capabilities of the each of the robotic devices, selecting a subset of robotic devices from the multiple robotic devices, and transmitting a command to each robotic device in the subset of robotic devices that instructs each respective robotic device to deploy to the location of the first sensor.

18 Claims, 12 Drawing Sheets

(56) References Cited

U.S. PATENT DOCUMENTS

| | | | |
|---|---|---|---|
| 2009/0303042 A1* | 12/2009 | Song | G08B 13/19647 340/566 |
| 2014/0022051 A1* | 1/2014 | Levien | A61M 5/20 340/5.2 |
| 2014/0254896 A1* | 9/2014 | Zhou | B25J 9/0006 382/124 |
| 2014/0303884 A1 | 10/2014 | Levien | |
| 2015/0290808 A1* | 10/2015 | Renkis | H04L 67/10 700/257 |
| 2015/0367513 A1* | 12/2015 | Gettings | G06Q 10/06 700/248 |
| 2016/0107749 A1* | 4/2016 | Mucci | B64C 39/024 701/3 |

* cited by examiner

ROBOTIC ASSISTANCE IN SECURITY MONITORING

CROSS-REFERENCE TO RELATED APPLICATION

This application claims the benefit of the U.S. Provisional Patent Application No. 62/132,494 filed Mar. 12, 2015 and entitled "Robotic Assistance in Security Monitoring," which is incorporated herein by reference in its entirety.

BACKGROUND

Security and surveillance systems have been utilized for years for both residential and commercial properties. Such systems may utilize a central monitoring system to detect when an alleged intrusion has occurred. For instance, the central monitoring system may be alerted when a motion sensor that has been mounted at a particular portion of the property detects motion. In some instances, the central monitoring system may transmit an alert to an operator's call center, or even local law enforcement that indicates that there may be a break-in at the property from which the alert originated.

Though such security and surveillance systems have certain advantages, such security and surveillance systems necessarily require a human element. That is, in response to the detection of an alert from a sensor, a human is required to respond to, and investigate, the reason why a sensor triggered an alert. This may put a person such as, for example, a property owner, a property custodian, a law enforcement officer, and/or the like at risk of harm.

SUMMARY

Techniques are described for robotic assistance in security monitoring. In some implementations, robotic devices operate inside and/or outside a property to assist in security monitoring. In response to an alarm event, the robotic devices may identify users of the property and provide assistance. Also, the robotic devices may identify an intruder and attempt to disrupt the intruder and collect identifying data about the intruder.

For example, a security system located at a property may be equipped with one or more flying drones that are configured to respond to commands from the security system and take action that assists with security monitoring. In this example, the flying drones operate automatically and have sensors and flight control processors that enable the drones to fly about a property both within the interior of the property and around the exterior of the property. The drones are configured to perform automated landing and, when not in use, land on charging stations that keep the batteries of the drones charged and ready to assist. The security system may use the drones to investigate activity detected by the security system and assist with alarm events. For instance, the security system may detect abnormal movement within the property and, in response, control a drone to fly to the area of the property where the movement was detected and take images of that area to check the movement detection. In addition, the security system may detect a security breach of the property and, in response, control one or more of the drones to gather information about the potential intruder that caused the security breach and perform actions that disrupt the potential intruder's purpose. In this regard, the security system may control an exterior drone to fly around the property and take images of any vehicles, including license plates, located near the property to aid in later identifying the intruder. Further, the security system may control a first interior drone to fly around the intruder in a randomized pattern in an attempt to distract and frighten the intruder into leaving the property. And, the security system may control a second interior drone to gather identifying information about the intruder, including flying close to the intruder to get a close range photograph of the intruder, record speech of the intruder to capture a voiceprint of the user, lightly touch the intruder with a biometric sampling tool that captures DNA of the intruder, etc. The security system may control the drones to perform any useful techniques that assist with security monitoring.

According to at least one aspect of the subject matter disclosed by this specification, a method, system, and apparatus, including computer programs encoded on storage devices, are disclosed for monitoring, security, and surveillance of a property. In some aspects, the subject matter in this specification may be embodied in a system that includes a plurality of robotic devices, a plurality of sensors located at different locations through a property, wherein the plurality of sensors includes a first sensor, a plurality of charging stations, and a monitor control unit. The monitor control unit may include a network interface, one or more processors, and one or more storage devices that include instructions that are operable, when executed by the one or more processors, to cause the one or more processors to perform operations. The operations may include receiving data from the first sensor that is indicative of an alarm event, determining the location of the first sensor, determining a security strategy for responding to the alarm event, accessing information describing the capabilities of each of the robotic devices, selecting a subset of robotic devices from the plurality of robotic devices based on the security strategy, transmitting a command to each robotic device in the subset of robotic devices that instructs each respective robotic device to navigate to the location of the property that includes the first sensor.

These and other versions each may optionally include one or more of the following features. For instance, the plurality of robotic devices may include at least one of a helicopter drone, a rolling helicopter drone, or a land vehicle device. Alternatively, in one implementation, each robotic device may be a quad-copter drone.

In one aspect, determining the security strategy for responding to the alarm event may further comprise determining one or more types of robotic devices that are needed based on the data from the first sensor, time of day, and the state of the monitoring system, and determining one or more types of actions that are needed based on the data from the first sensor, time of day, and the state of the monitoring system.

In other implementations, determining the security strategy for responding to the alarm event may further comprise selecting either a deterrence based security strategy or a confrontation based security strategy. In some aspects, the operations may further comprise receiving data from the first sensor that is indicative of the force that was used to break a window or a door. Then, in one aspect, the operations may further comprise determining that the force exceeds a predetermined threshold, and in response to determining that the force exceeds a predetermined threshold, selecting a confrontation based security strategy. In another aspect, the operations may further comprise determining that the force falls below a predetermined threshold, and in response to determining that the force falls below a predetermined threshold, selecting a deterrence based security strategy.

In other aspects, the operations may further comprise determining that a deterrence based strategy should be utilized based on the data from the first sensor, and in response to determining that a deterrence based strategy should be utilized, selecting a subset of robotic devices that are equipped to deter a person from entering into a building on the property. In such an implementation, robotic devices equipped to deter a person from entering the property may include a biometric reader, a facial recognition camera, or a holographic projector.

In other implementations, the operations may further comprise determining that a confrontation based strategy should be utilized based on the data from the first sensor, and in response to determining that a confrontation based strategy should be utilized, selecting a subset of robotic devices that are equipped to confront a person. In such an implementation, robotic devices equipped to confront a person may include an audio output device, a bright light, or a taser.

In yet other implementations, the operations may further comprise determining the current location of each of the plurality of robotic devices, selecting a particular robotic device that is currently nearest in proximity to the location of the first sensor, and deploying the particular robotic device to the location of the first sensor.

In other aspects, determining the location of the first sensor may include obtaining a sensor identifier from received data, accessing a set of information associated with each of the plurality of sensors, and obtaining, from the set of information associated each of the plurality of sensors, the location information that corresponds to the received sensor identifier.

In some implementations, the operations may further comprise determining whether each of the plurality of robotic devices have a current battery level that exceeds a predetermined battery level threshold, and selecting at least one robotic device based, at least in part, on the determination that the at least one robotic device has a current battery level that satisfies the predetermined threshold.

In other implementations, the operations may further comprise determining that the current battery level of at least one deployed robotic device has fallen below a predetermined battery level threshold, and transmitting an instruction to the at least one deployed robotic device that instructs the at least one robotic device to return to a particular wireless charging station that was identified based on location and occupancy status.

In one aspect, the operations may include receiving a communication from at least one robotic device in the subset of robotic devices that provides a real-time update regarding the status of the alarm event.

In yet other implementations, each of the plurality of robotic devices are configured to function only within a predetermined distance of a property where the central monitor control unit resides.

In some aspects, the command may also include a particular action that each respective robotic device is to perform. Alternatively, in other aspects, the command may include an instruction to navigate according to a predetermined flight path learned by a robotic device.

DETAILED DESCRIPTION

According to at least one aspect of the subject matter disclosed by this specification, a method, system, and a computer program are disclosed that provide for security, monitoring, and surveillance of a property using a fleet of one or more robotic devices. The fleet of robotic devices may be deployed and supervised by a central monitor control unit based on the detection of one or more alarm events. The alarm events may be detected by multiple sensors that may be strategically placed throughout the property. A fleet of robotic devices may include one or more robots, drones, or other machines that may be configured to navigate to a particular location and carry out a series of program instructions. The fleet of robotic devices may be comprised of robotic devices that may navigate through the air, on the ground, on top of a body of water, under the surface of a body of water, or any combination thereof. In some implementations, the fleet of robotic devices may include, for example, flying helicopter drones, flying quadcopter drones, rolling drones, submarine drones, bi-pedal humanoid robots, or the like.

Each robotic device of the fleet of robotic devices may be equipped to address one, or multiple, specific alarm events. Certain robotic devices, for example, may be equipped to inspect a portion of a property associated with an alarm event using audio sensors, video sensors, thermal sensors, air sensors, or the like in order to determine if there is an active threat associated with the alarm event. Other robots may, for example, seek to deter a potential intruder by for example projecting a life-like hologram that provides the appearance of occupants present at the property. Yet other robots may, for example, be configured to actively engage an intruder by playing loud audio music, shining extremely bright lights, swarming an intruder, firing a taser, or the like.

The fleet of robots provided by this disclosure may be networked together, and integrated with, a property's security and surveillance system. The fleet of robots may utilize one, or more, of the aforementioned features, or other features, to actively surveil a property in response to one or more detected alarm events. The fleet of robots may provide information gathered during a deployment regarding the current state of a detected threat back to the central monitor control unit. Alternatively, or in addition, one or more of the robots may attempt to deter, or even actively engage, an intruder detected in response to an alarm event. The use of this fleet of robots thus facilitates enhanced property management, security, and surveillance. Though the fleet of robots may be deployed, and controlled by a central monitor control unit, one or more of the robots may be controlled by a user via one or more of a mobile device, virtual reality headset, or the like.

Figure 1:
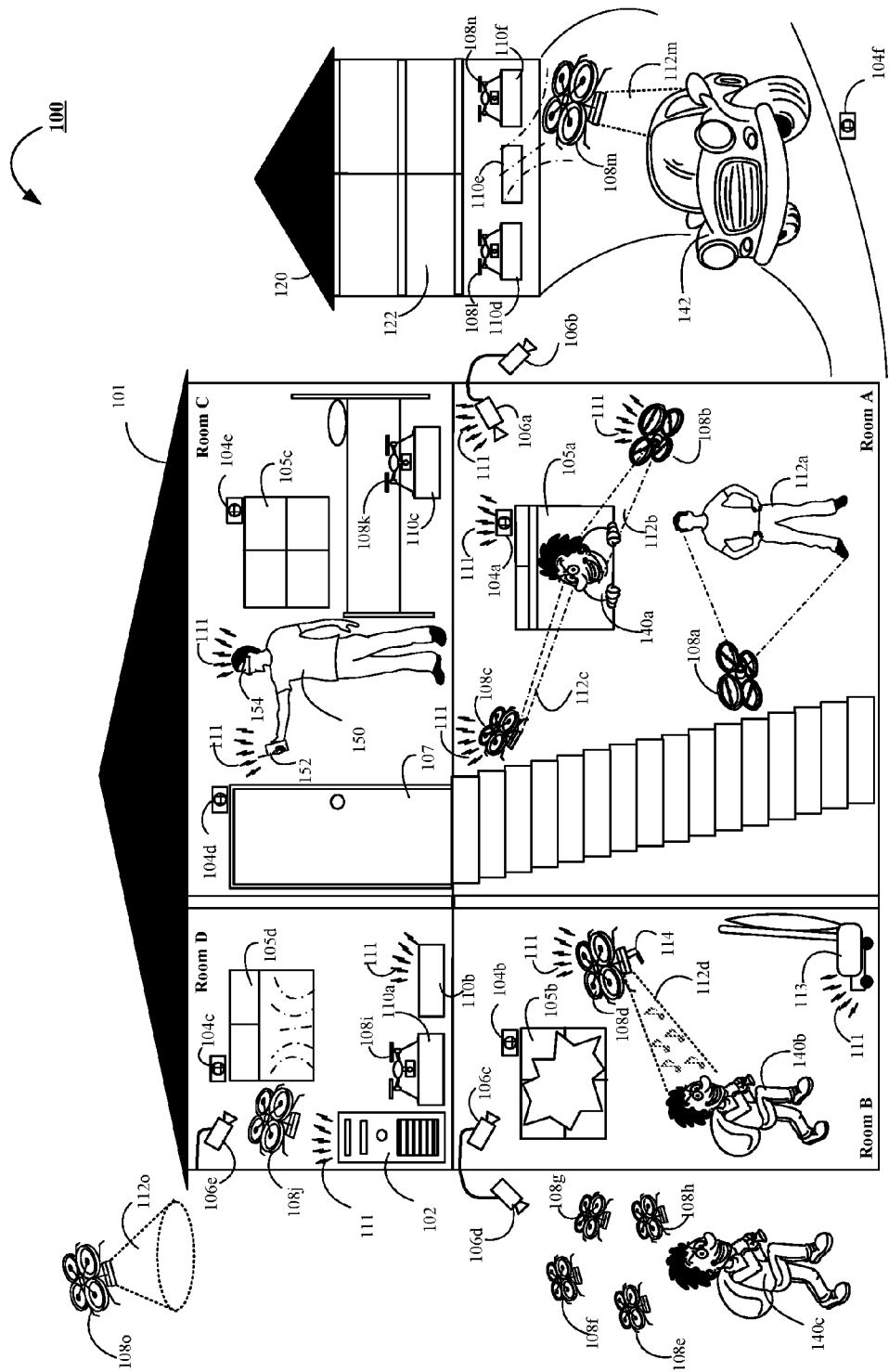
FIG. 1 is a contextual diagram showing features of an example of a security monitoring system employed in a property that may utilize one or more robotic devices.

FIG. 1 is a contextual diagram showing features of an example of a security monitoring system 100 employed in a property 101 that may utilize one or more robotic devices 108a, 108b, . . . 108o.

The security monitoring system 100 employed by property 101 may include, for example, a central monitor control unit 102, multiple sensors 104a, 104b, 104c, 104d, 104e, 104f, multiple cameras 106a, 106b, 106c, 106d, 106e, multiple robotic devices 108a, 108b, 108c, 108d, 108e, 108f, 108g, 108h, 108i, 108j, 108k, 108l, 108m, 108n, 108o, and multiple robotic device charging stations 110a, 110b, 110c, 110d, 110e, 110f. The features of security monitoring system 100 may be described within the context of a property invasion being committed by multiple burglars 140a, 140b, 140c.

The security monitoring system 100 may facilitate networked communication between each component of security monitoring system 100 including for example, the central monitor control unit 102, sensors 104a, 104b, . . . 104f, cameras 106a, 106b, . . . 106e, robotic devices 108a, 108b, . . . 108o, and charging stations 110a, 110b, . . . 110f via network 111. The network 111 may include, for example, any type of wired or wireless network that facilitates communication between the components of the security monitoring system 100 including a local area network, a wide area network, or multiple networks working together including, but not limited to, the Internet. Data feeds from each component of security monitoring system 100 may be continuously, or periodically, provided to the central monitor control unit 102 from each component of security monitoring system 100 via network 111. The central monitor control unit 102 may analyze the received feeds, store the received feeds, transmit the feeds to a system operator, transmit the feeds to local law enforcement, transmit the feeds to a property occupant's 150 mobile device 152, transmit the feeds to a property occupant's 150 virtual reality headset 154, or the like. Based on the analysis of the received feeds, or in response to a request from a property occupant 150, the central monitor unit may deploy one or more robotic devices 108a, 108b, . . . 108o.

The central monitor control unit 102 may be configured to receive notifications of alarm events from each sensor 104a, 104b, 104c, 104d, 104e, 104f that is installed within a particular property 101. Sensors 104a, 104b, 104c, 104d, 104e, 104f may include any type of sensor or detector that may monitor a property to identify an alarm event. For instance, sensors 104a, 104b, 104c, 104d, 104e, 104f may include, for example, a contact sensor, motion sensor, a glass break sensor, or any other sensors that may be configured to detect a potential property invasion by an intruder such as, burglar 140a, 140b, 140c. However, sensors 104a, 104b, 104c, 104d, 104e, 104f may not be so limited. For instance, as described in more detail below, sensors 104a, 104b, 104c, 104d, 104e, 104f may also include environmental sensors, health sensors, or the like. The sensors 104a, 104b, 104c, 104d, 104e, 104f may broadcast notifications of potential alarm events that may be received by central monitor control unit 102 using a network connection 111. The central monitor control unit 102 may deploy one or more multiple robotic devices 108a, 108b, . . . 108o based on the received alarm event. In some implementations, a particular robotic device may be sent to a particular portion of the property 101 based on the type of alarm event notification received by central monitor control unit 102. However, other factors may be considered by central monitor control unit 102 to determine which robotic device 108a, 108b, . . . 108o to deploy to particular portions of property 101, as is discussed in more detail below. Alternatively, in certain implementations, all available robotic devices 108a, 108b, . . . 108o may be deployed in response to one or multiple alarm events.

The robotic devices 108a, 108b, . . . 108o of security monitoring system 100 are depicted as helicopter type flying devices such as, quad-copters. However, other types of robotic devices may be used with security monitoring system 100. For instance, rolling helicopter type devices, and land based robots may also be used. The robotic devices 108a, 108b, . . . 108o may be equipped with a variety of different tools to assist with security management and surveillance of a particular property. For instance, robotic devices may be equipped with one or more of a retinal scanner, a facial recognition camera, a high resolution still image camera, a high definition video camera, a holographic projector, an audio output device, a video output device, other biometric scanners, tasers, or the like. In certain instances, one or more of the aforementioned tools may be integrated into a single unit. For instance, a camera may provide facial recognition, high resolution still images, and high definition video.

The robotic devices 108a, 108b, . . . 108o may be configured to receive, interpret, and execute commands from a central monitor control unit 102. Each robotic device 108a, 108b, . . . 108o may be configured to communicate wirelessly with any other component of security monitoring system 100 via network 111. For instance, a particular robotic device 108d may detect an alert event being broadcast by a particular sensor 104b. Alternatively, or in addition, a particular robot 108b may stream a live video feed of a burglar 140a trying to break into a window 105a of property 101 to a property occupant's 150 virtual reality headset 154. Alternatively, or in addition, a particular robot 108m may transmit a picture of a burglar's license plate to the central monitor control unit 102. Alternatively, a particular robotic device 108f may send a communication to robotic device 108j in order to request robotic device's 108j assistance in swarming a burglar 140c in an attempt to get the burglar 140c to abandon the burglar's 140c attempt to invade property 101. Numerous other types of communication may occur between a particular robotic device 108a, 108b, . . . 108o to one, or multiple, other components of security monitoring network 100.

The robotic devices 108a, 108b, . . . 108o may be particularly associated with a particular property 101. For instance, the robotic devices 108a, 108b, . . . 108o may be configured to function only within a predetermined distance of a property 101 where the central monitor control unit 102 resides. Alternatively, robotic devices 108a, 108b, . . . 108o may be configured such that the robotic devices 108a, 108b, . . . 108o only function with a predetermined distance of the property 101, the central monitor control unit 102, one or more sensors 104a, 104b, . . . 104f, one or more charging stations 110a, 110b, . . . 110f, and/or the like.

The charging stations 110a, 110b, 110c, 110d, 110e, 110f may each provide a platform for recharging each of the robotic devices 108a, 108b, . . . 108o. The charging stations 110a, 110b, . . . 110f may include contact-based charging systems, or wireless charging systems. The robotic devices 108a, 108b, . . . 108o may be configured to land on, or fly near, the charging stations in order to recharge the battery that powers each respective robotic device. Each robotic device 108a, 108b, . . . 108o may be assigned to a particular charging station 110a, 110b, . . . 110f. Alternatively, a security monitoring system 100 may not utilize any predetermined charging station assignments. For instance, a charging station 110b may communicate its occupancy status to a central monitoring control unit 102. Then, each of the robotic devices 108a, 108b, . . . 108o may communicate with the central monitoring control unit 102 to request a charging station when the robotic device's battery falls below a predetermined threshold. The central monitoring control unit 102 may then command the robotic device to navigate to a particular charging station based on consideration of at least the charging station's occupancy status and location. In some implementations, a particular robotic device 108a, 108b, . . . 108o may be able to directly communicate with a particular charging station via network 111 in order to determine the charging station's occupancy status and/or location.

Components of the security monitoring system 100 may work together in order to deter a burglar 140a from following through with an attempted property invasion as illustrated with respect to Room A of property 101. For instance, a sensor 104a may detect that a burglar 140a is attempted to break-in to the property 101 via window 105a. In response to the burglar's 140a jostling of the window 105a, the sensor 104a may broadcast a notification of an alarm event via network 111. The central monitoring control unit 102 may receive the broadcast alarm event notification, and dispatch multiple robotic devices such as robotic devices 108a, 108b, 108c to the location associated with sensor 104a in an effort to deter burglar 140a from completing the burglar's 140a invasion of property 101. The central monitoring control unit 102 may determine that the robotic devices 108a, 108b, 108c should employ a deterrence security strategy with respect to burglar 140a based on the alarm event notification received from 104a, live feed video from camera 106a, and/or other sensor/detector information, each of which may provide an indication that the burglar 140a has not yet entered into the property 101.

In the example of Room A, a robotic device 108a may attempt to deter the burglar 140a from invading the property 101 by using a holographic projector to display a life-like, three dimensional, holographic image 112a of the propert's occupant(s). The holographic image 112a may be displayed in a manner that conveys a visual illusion of multiple occupants residing within the property 101. In such instances, a burglar 140a may be deterred form invading the property 101 if the burglar believes that one or multiple occupants of the property are currently home. In some instances, holographic images 112a projected by robotic device 108a may be customized to represent photo-realistic physical characteristics of the property occupant. Alternatively, other types of holographic images 112a may be projected by a robotic device 108a. For instance, robotic device 108a may project a photo-realistic representation of one, or multiple, barking dogs in an effort to deter burglar 140a from following through with the burglar's 140a invasion of property 101 through window 105a. Robotic device 108a, or another robotic device associated with security monitoring system 100, may employ other similar measures in an attempt to deter a burglar 140a from invading the property. For instance, the robotic device 108a may communicate with one or more other components of security monitoring system to turn lights in the property on/off, instruct a radio to playback music, turn on a television, or the like.

It is contemplated that there may exists scenarios where sensor 104a may broadcast an alarm event notification where the person attempting to enter through window 105a is not a burglar 140a, or other menacing intruder. For instance, the person at window 105a that jostled window 105a that resulted in sensor 104a broadcasting an alarm event notification may be a lawful occupant of the property who forgot his/her keys to the property 101. Accordingly, one or more of the deployed robotic devices such as robotic device 108b, 108c may determine whether the person at window 105a is indeed a menacing intruder.

For instance, a robotic device 108b may use a camera to perform a facial recognition scan 112b of the burglar 140a attempting to enter the property through window 105a. The robotic device 108b may perform image analysis techniques on the obtained facial scan in order to determine whether the burglar 140a is a property occupant. For instance, the robotic device 108b may include a picture of each lawful property occupant stored in the robotic device's 108b local memory. Alternatively, or in addition, the robotic device 108b may transmit the facial scan to central monitor control unit 102 via network 111. The central monitor control unit 102 may connect to an operator, local law enforcement, federal law enforcement database, and/or the like in order to search one or multiple databases in an attempt to identify the burglar 140a. Local and/or federal authorities may then be notified in the event a match is found.

The robotic device 108b may send a real time update to the central monitor control unit 102 that indicates whether the threat associated with the alarm event notification broadcast by sensor 104a has subsided. For instance, in the event that the analysis of the facial scan obtained by robotic device 108b indicates that the burglar 140a at window 105a is a lawful occupant of the property 101, the robotic device 108b may send a real time update to the central monitor control unit 102 that indicates that the threat associated with the alarm event notification broadcast by sensor 104a has subsided. Alternatively, if the results of the analysis of the facial scan obtained by robotic device 108b indicates that the burglar 140a is not a lawful occupant of the property 101, the robotic device 108b may send a real time update to the central monitor control unit 102 that indicates that the threat associated with the alarm event notification broadcast by sensor 104a is severe. In such instances, central monitor control unit 102 may contact an operator, local law enforcement, and/or deploy more robotic devices that may be commanded to employ a more aggressive security strategy that may include active engagement of burglar 140a.

The example described above with respect to Room A utilized a robotic device 108b that was armed with a camera configured to obtain a facial recognition scan 112b of a burglar 140a, and perform a facial recognition analysis in order to determine if the burglar 140a is a lawful occupant of the property 101. However, other methods may be employed by robotic device 108b, or other robotic devices, in order to identify a burglar 140a. For instance, a robotic device 108c may be deployed by a central monitoring control unit 102 that includes one or more biometric readers. For instance, a robotic device 108c may perform a retinal scan 112c of a burglar 140a in an attempt to determine whether the burglar 140a is a menacing intruder or a lawful occupant of the property. The robotic device 108c may implement the biometric search in the same, or substantially similar, manner as the facial recognition search.

For instance, robotic device 108c may compare biometric samples 112c obtained from the burglar 140a against biometric samples of each lawful occupant of the property that the robotic device 108c stores in a local memory device. Alternatively, or in addition, the robotic device 108c may transmit the obtained biometric samples 112c to central monitor control unit 102 via network 111. The central monitor control unit 102 may connect to an operator, local law enforcement, federal law enforcement database, and/or the like in order to search one or multiple biometric databases in an attempt to identify the burglar 140a. Local and/or federal authorities may then be notified in the event a match is found. The robotic device 108c may provide real-time updates to the central monitor control unit 102 based on the outcome of the biometric sample search that indicates whether the threat associated with the alarm event notification broadcast by sensor 104a has subsided in the same, or substantially similar, manner as described above with respect to the facial recognition scan.

Components of the security monitoring system 100 may also work together in order to actively engage, or confront, a burglar 140b that has completed a property invasion of property 101 as illustrated with respect to Room B. For instance, a sensor 104b may detect that a burglar 140b broke the glass of window 105b. Alternatively, or in addition, one or more motion sensors may indicate that the burglar 140b has physically invaded the property 101. In response to the burglar's 140b breaking of window 105b, the sensor 104b may broadcast a notification of an alarm event via network 111. The central monitoring control unit 102 may receive the broadcast alarm event notification, and dispatch one or multiple robotic devices such as robotic device 108d to the location associated with sensor 104b in an effort to actively engage, or confront, the burglar 140b that is now inside Room B of property 101. The central monitoring control unit 102 may determine that the robotic device 108d should employ a more aggressive, confrontational security strategy with respect to burglar 140b based on the alarm event notification received from 104b, live feed video from camera 106c, and/or other sensor/detector information that indicates the burglar 140b is already inside property 101.

In the example of Room B, a robotic device 108d may first take appropriate steps to determine whether the burglar 140b is indeed a menacing intruder. Alternatively, such verification may already have been performed. For instance, intruder verification may have been performed by one or more other robotic devices such as, for example, robotic devices 108b, 108c during an initial wave of robotic device deployments in order to deter burglar 140b from following through with his/her attempt to break-in to the property 101 via window 105b, as described above with respect to Room A. Alternatively, the central monitor control unit 102 may perform facial recognition analysis based on images obtained via camera 106c, or one or more live feeds provided by a camera associated with one or more robotic devices, and then notified robotic device 108d that the burglar 140b is indeed a menacing intruder. Alternatively, upon detection of an alarm event notification from 104b in response to the breaking of window 105b, a property occupant 150 may have fled to a secure Room C, equipped himself/herself with a virtual reality headset 154, begun monitoring a live video feed from camera 106c, robotic device 108d, or the like, and confirmed that burglar 140b is not a lawful occupant of the property 101. Other methods of determining that the burglar 140b is a menacing intruder may also fall within the scope of the present disclosure.

The robotic device 108d may employ a more aggressive approach after it is determined that burglar 140b is a menacing intruder. For instance, the robotic device may utilize an audio output device to output different audio signals 112d. The audio signals 112d may include music, or other sounds that are played back at extremely high volumes in an effort to distract, disable, or frighten away the burglar 140b. Alternatively, or in addition, the audio signals 112d may include a live audio stream from property occupant 150 warning the burglar 140b that the property occupant is home, and armed with a firearm in an effort to scare away the burglar 140b. Alternatively, or in addition, the audio signal 112d may include a predetermined recording that alerts the burglar 140b that local law enforcement have been notified, and are currently on their way to the property 101.

Security monitoring system 100 may periodically escalate the types of non-lethal means that are used to confront burglar 140b in an attempt to distract, disable, or frighten away the burglar 140b if the threat from burglar 140b continues to persist. For instance, the robotic device 108d, or another robotic device that has been deployed to Room B, may also be equipped with an extremely bright light. In such instances, the central monitor control unit 102 may instruct the robotic device 108d, or other deployed robotic device, to shine the bright light into the eyes of the burglar 140b in an effort to blind the burglar 140b. Alternatively, or in addition, central monitor control unit 102 may activate other electronic devices such as, for example, a vacuum cleaner 113 to chase after a blinded burglar 140b in an effort to cause the burglar 140b to trip and fall. To the extent such methods fail to distract, disable, or frighten away a burglar 140b, security monitoring system 100 may employ even greater means of non-lethal force against burglar 140b. For instance, a robotic device 108d may include a taser 114. If a burglar 140b cannot be distracted, disabled, or frightened away by other non-lethal means, the central monitor control unit 102 may instruct the robotic device 108d to shoot the burglar 140b with the taser 114. The taser 114 may launch dart like electrodes towards the burglar 140b that are connected to the power supply of robotic device 108d in order to deliver an electric current into the burglar 140b that may temporarily disable the burglar 140b. Yet, even other types of non-lethal force may be administered by security system 100 in an effort to distract, disable, or frighten away the burglar 140b.

The central monitor control unit 102 may be configured to deploy one or more robotic devices inside the property 101 such as, for example, robotic devices 108a, 108b, 108c, 108d, 108i, 108j, 108k. Alternatively, or in addition, central monitor control unit 102 may also deploy one or more robotic devise outside the property 101 such as, for example, robotic devices 108e, 108f, 108g, 108h, 108m, 108o. Accordingly, security monitoring system 100 may be comprised of a subset of robotic devices that are configured for indoor use, a subset of robotic devices that may be configured for outdoor use, and/or a subset of robotic devices that may be configured for indoor and outdoor use.

Central monitor control unit 102 may therefore determine to deploy robotic devices outside the property 101 in response to certain alarm event notifications. In such instances, central monitor control unit 102 may instruct a robotic device to fly out of the property 101 through an open window 105d. For instance, the central monitor control unit 102 may deploy robotic device 108o through window 105d in response to an alarm event notification. The robotic device 108o may circle the property 101 and shine a floodlight 112o around the external boundaries of property 101. The floodlight 112o may frighten away burglars positioned outside the property 101 such as, burglar 140c. Alternatively, or in addition, the central monitor control unit 102 may similarly deploy a robotic device through window 105d in response to an alarm notification event notification. Such a robotic device may circle the property 101 and use a camera to provide a live video feed to central monitor control unit 102, a property occupant's 150 mobile device 152, a property occupant's 150 virtual reality headset 154, or the like. Alternatively, or in addition, a central monitor control unit 102 may receive an alarm event notification from an outdoor sensor 104f.

An alarm event notification from sensor 104f alone, or in combination with information from camera 106b, may provide an indication that a car is parked in the driveway of property 101 that does not belong to any of the property's lawful occupants. For instance, the sensor 104f may broadcast an alarm event notification that indicates that the car 142 weighs differently than each of the cars owned by the lawful occupants of the property. In response to the alarm event notification from sensor 104f, central monitor control unit 102 may instruct the garage door 122 of the garage 120 to open so that the central monitor control unit 102 can deploy one or more of the robotic devices residing within the garage 120. For instance, the central monitor control unit 102 may deploy robotic device 108m in order to take a picture 112m of the license plate of car 142. The robotic device 108m may determine whether the license plate is associated with a lawful occupant of the property 101 in the same, or substantially similar, manner as described with respect to facial scans, and biometric data. The robotic device 108m may provide a real-time update the central monitor control unit 102 based on the results of the license plate analysis.

In some instances, the burglar 140c may be detected by the externally deployed robotic device 108o or an external camera 106d and determined to be a menacing intruder. In addition, since it is night-time, and the security monitoring system is already in a high state of alert from dealing with two other burglars 140a, 140b, the central monitor control unit 102 may decide to utilize a more aggressive security strategy. For instance, central monitor control unit 102 may decide to employ a confrontation based security strategy in an attempt to frighten the burglar 140c away from following through with an invasion of property 101. For example, the central monitor control unit 102 may deploy multiple robotic devices 108e, 108f, 108g, 108h, and instruct each of robotic devices 108e, 108f, 108g, 108h to swarm the burglar 140c. The robotic devices 108e, 108f, 108g, 108h may swarm the burglar 140c by implementing random navigation paths in circles, ovals, figure eights, and other patterns at high speeds around the burglar 140c. In addition to swarming the burglar 140c, the deployed robotic devices may shine bright lights in the burglar's 140c eyes and/or playback audio at extremely loud volumes. The combined effect of the swarming, bright lights, and loud audio may serve to distract, disable, or frighten away the burglar 140c before the burglar 140c can enter the property 101.

Responding to threats posed by burglars 140a, 140b, 140c may result in the deployment of multiple robotic devices. In some instances, the robotic devices may be deployed for long periods of time using battery intensive devices such as, for example, high resolution video cameras, wireless communications devices, motors to power the robotic devices rotors, floodlights, or the like. In such instances, the battery power for each respective robotic device may become critically low. As a result, central monitor control unit 102 may monitor the battery level of each deployed robotic device, and then instruct robotic devices that are associated with a battery level that falls below a predetermined threshold to return to a charging station 110a, 110b, . . . 110f to recharge each respective robotic device's battery. Central monitor control unit 102 may deploy additional robotic devices to take the place of the robotic devices that have returned to charging stations.

The description of security monitoring system 100 utilizes a central monitor control unit 102, multiple sensors 104a, 104b, . . . 104f, multiple cameras 106a, 106b, . . . 106e, multiple robotic devices 108a, 108b, . . . 108o, and multiple charging stations 110a, 110b, . . . 110f, among other things. However, the number of each network component depicted in illustration of system 100 should not be viewed as limiting. For instance, a system 100 may utilize multiple central monitor control units 102. Alternatively, or in addition, system 100 may use more, or less, sensors, robotic devices, cameras, charging stations, or the like for any particular implementation of system 100.

Figure 2:
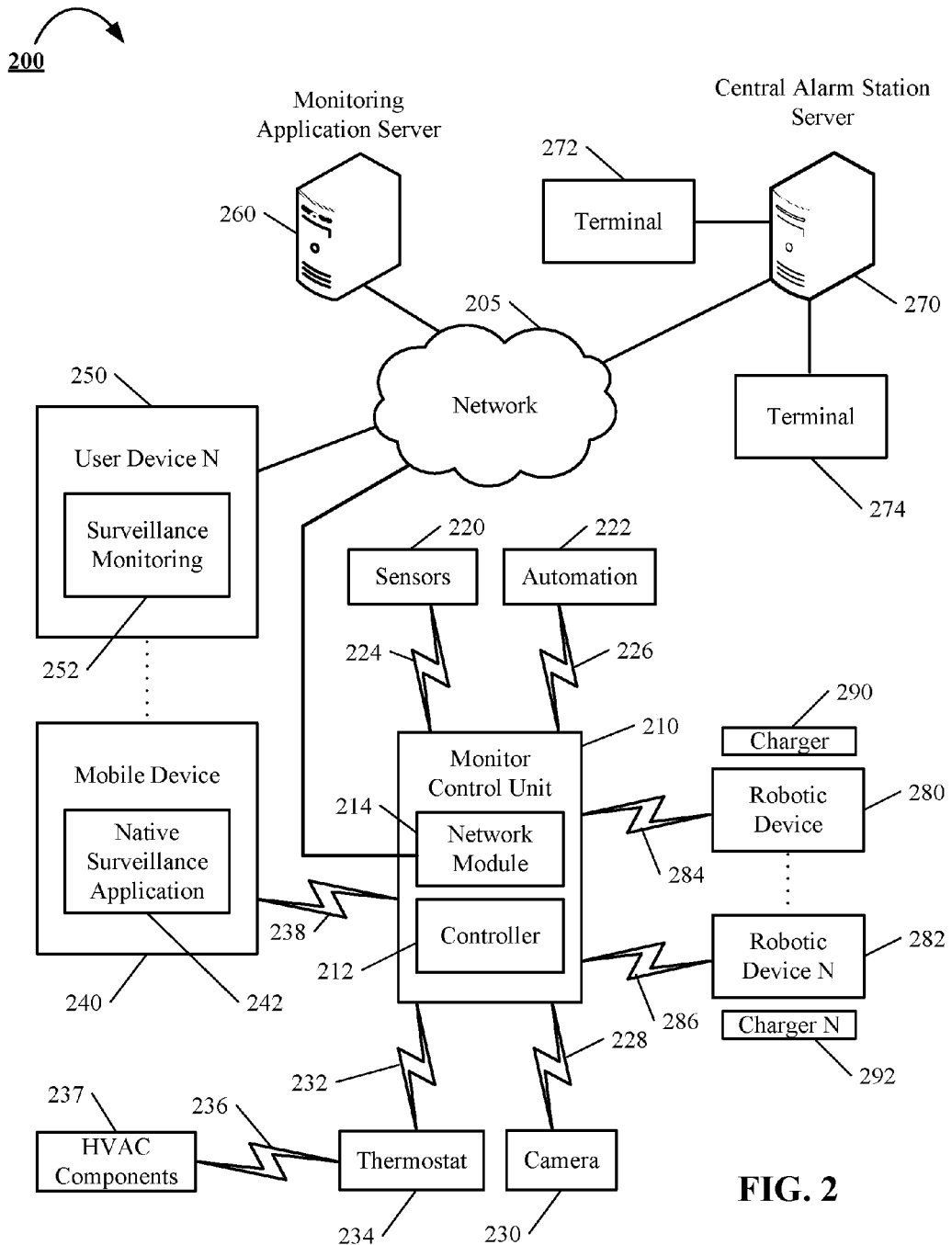
FIG. 2 is a block diagram of an example of a security monitoring system that may utilize one or more robotic devices.

FIG. 2 is a block diagram of an example of a security monitoring system that may utilize one or more robotic devices.

The electronic system 200 includes a network 205, a monitoring system control unit 210, one or more user devices 240, 250, a monitoring application server 260, and a central alarm station server 270. In some examples, the network 205 facilitates communications between the monitoring system control unit 210, the one or more user devices 240, 250, the monitoring application server 260, and the central alarm station server 270.

The network 205 is configured to enable exchange of electronic communications between devices connected to the network 205. For example, the network 205 may be configured to enable exchange of electronic communications between the monitoring system control unit 210, the one or more user devices 240, 250, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system control unit 210 communicates with the module 222 and the camera 230 to perform surveillance or monitoring. The module 222 is connected to one or more devices that enable home automation control. For instance, the module 222 may be connected to one or more lighting systems and may be configured to control operation of the one or more lighting systems. Also, the module 222 may be connected to one or more electronic locks at the property and may be configured to control operation of the one or more electronic locks (e.g., control Z-Wave locks using wireless communications in the Z-Wave protocol. Further, the module 222 may be connected to one or more appliances at the property and may be configured to control operation of the one or more appliances. The module 222 may include multiple modules that are each specific to the type of device being controlled in an automated manner. The module 222 may control the one or more devices based on commands received from the monitoring system control unit 210. For instance, the module 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building monitored by the monitoring system control unit 210. The camera 230 may be configured to capture single, static images of the area and also video images of the area in which multiple images of the area are captured at a relatively high frequency (e.g., thirty images per second). The camera 230 may be controlled based on commands received from the monitoring system control unit 210.

The camera 230 may be triggered by several different types of techniques. For instance, a Passive Infra Red (PIR) motion sensor may be built into the camera 230 and used to trigger the camera 230 to capture one or more images when motion is detected. The camera 230 also may include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a command to capture an image when external devices detect motion or another potential alarm event. The camera 230 may receive the command from the controller 212 or directly from one of the sensors 220.

In some examples, the camera 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The camera 230 may be programmed with any combination of time/day schedules, system "arming state", or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the monitoring control unit 210. The camera 230 may employ a small solar cell to recharge the battery when light is available. Alternatively, the camera 230 may be powered by the controller's 212 power supply if the camera 230 is co-located with the controller 212.

In some implementations, the camera 230 communicates directly with the monitoring application server 260 over the Internet. In these implementations, image data captured by the camera 230 does not pass through the monitoring system control unit 210 and the camera 230 receives commands related to operation from the monitoring application server 260.

The system 200 also includes thermostat 234 to perform dynamic environmental control at the property. The thermostat 234 is configured to monitor temperature and/or energy consumption of an HVAC system associated with the thermostat 234, and is further configured to provide control of environmental (e.g., temperature) settings. In some implementations, the thermostat 234 can additionally or alternatively receive data relating to activity at a property and/or environmental data at a property, e.g., at various locations indoors and outdoors at the property. The thermostat 234 can directly measure energy consumption of the HVAC system associated with the thermostat, or can estimate energy consumption of the HVAC system associated with the thermostat 234, for example, based on detected usage of one or more components of the HVAC system associated with the thermostat 234. The thermostat 234 can communicate temperature and/or energy monitoring information to or from the monitoring system control unit 210 and can control the environmental (e.g., temperature) settings based on commands received from the monitoring system control unit 210.

In some implementations, the thermostat 234 is a dynamically programmable thermostat and can be integrated with the monitoring system control unit 210. For example, the dynamically programmable thermostat 234 can include the monitoring system control unit 210, e.g., as an internal component to the dynamically programmable thermostat 234. In addition, the monitoring system control unit 210 can be a gateway device that communicates with the dynamically programmable thermostat 234.

A module 237 is connected to one or more components of an HVAC system associated with a property, and is configured to control operation of the one or more components of the HVAC system. In some implementations, the module 237 is also configured to monitor energy consumption of the HVAC system components, for example, by directly measuring the energy consumption of the HVAC system components or by estimating the energy usage of the one or more HVAC system components based on detecting usage of components of the HVAC system. The module 237 can communicate energy monitoring information and the state of the HVAC system components to the thermostat 234 and can control the one or more components of the HVAC system based on commands received from the thermostat 234.

The system 200 further includes one or more robotic devices 280 and 282. The robotic devices 280 and 282 may be any type of robots that are capable of moving and taking actions that assist in security monitoring. For example, the robotic devices 280 and 282 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 280 and 282 may be robotic devices that are intended for other purposes and merely associated with the monitoring system 200 for use in appropriate circumstances. For instance, a robotic vacuum cleaner device may be associated with the monitoring system 200 as one of the robotic devices 280 and 282 and may be controlled to take action responsive to monitoring system events.

In some examples, the robotic devices 280 and 282 automatically navigate within a property. In these examples, the robotic devices 280 and 282 include sensors and control processors that guide movement of the robotic devices 280 and 282 within the property. For instance, the robotic devices 280 and 282 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 280 and 282 may include control processors that process output from the various sensors and control the robotic devices 280 and 282 to move along a path that reaches the desired destination and avoids obstacles. In this regard, the control processors detect walls or other obstacles in the property and guide movement of the robotic devices 280 and 282 in a manner that avoids the walls and other obstacles.

In addition, the robotic devices 280 and 282 may store data that describes attributes of the property. For instance, the robotic devices 280 and 282 may store a floorplan and/or a three-dimensional model of the property that enables the robotic devices 280 and 282 to navigate the property. During initial configuration, the robotic devices 280 and 282 may receive the data describing attributes of the property, determine a frame of reference to the data (e.g., a home or reference location in the property), and navigate the property based on the frame of reference and the data describing attributes of the property. Further, initial configuration of the robotic devices 280 and 282 also may include learning of one or more navigation patterns in which a user provides input to control the robotic devices 280 and 282 to perform a specific navigation action (e.g., fly to an upstairs bedroom and spin around while capturing video and then return to a home charging base). In this regard, the robotic devices 280 and 282 may learn and store the navigation patterns such that the robotic devices 280 and 282 may automatically repeat the specific navigation actions upon a later request.

In some examples, the robotic devices 280 and 282 may include data capture and recording devices. In these examples, the robotic devices 280 and 282 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 280 and 282 to take and store a biometric sample that can be used to identify the person (e.g., a biometric sample with DNA that can be used for DNA testing).

In some implementations, the robotic devices 280 and 282 may include output devices. In these implementations, the robotic devices 280 and 282 may include one or more displays, one or more speakers, one or more projectors, and/or any type of output devices that allow the robotic devices 280 and 282 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 280 and 282 also may include a communication module that enables the robotic devices 280 and 282 to communicate with the monitoring system control unit 210, each other, and/or other devices. The communication module may be a wireless communication module that allows the robotic devices 280 and 282 to communicate wirelessly. For instance, the communication module may be a Wi-Fi module that enables the robotic devices 280 and 282 to communicate over a local wireless network at the property. The communication module further may be a 900 MHz wireless communication module that enables the robotic devices 280 and 282 to communicate directly with the monitoring system control unit 210. Other types of short-range wireless communication protocols, such as Bluetooth, Bluetooth LE, Zwave, Zigbee, etc., may be used to allow the robotic devices 280 and 282 to communicate with other devices in the property.

The robotic devices 280 and 282 further may include processor and storage capabilities. The robotic devices 280 and 282 may include any suitable processing devices that enable the robotic devices 280 and 282 to operate applications and perform the actions described throughout this disclosure. In addition, the robotic devices 280 and 282 may include solid state electronic storage that enables the robotic devices 280 and 282 to store applications, configuration data, collected sensor data, and/or any other type of information available to the robotic devices 280 and 282.

The robotic devices 280 and 282 are associated with one or more charging stations 290 and 292. The charging stations 290 and 292 may be located at predefined home base or reference locations in the property. The robotic devices 280 and 282 may be configured to navigate to the charging stations 290 and 292 after completion of tasks needed to be performed for the monitoring system 200. For instance, after completion of a monitoring operation or upon instruction by the monitoring system control unit 210, the robotic devices 280 and 282 may be configured to automatically fly to and land on one of the charging stations 290 and 292. In this regard, the robotic devices 280 and 282 may automatically maintain a fully charged battery in a state in which the robotic devices 280 and 282 are ready for use by the monitoring system 200.

The charging stations 290 and 292 may be contact based charging stations and/or wireless charging stations. For contact based charging stations, the robotic devices 280 and 282 may have readily accessible points of contact that the robotic devices 280 and 282 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 280 and 282 may charge through a wireless exchange of power. In these cases, the robotic devices 280 and 282 need only locate themselves closely enough to the wireless charging stations for the wireless exchange of power to occur. In this regard, the positioning needed to land at a predefined home base or reference location in the property may be less precise than with a contact based charging station. Based on the robotic devices 280 and 282 landing at a wireless charging station, the wireless charging station outputs a wireless signal that the robotic devices 280 and 282 receive and convert to a power signal that charges a battery maintained on the robotic devices 280 and 282.

In some implementations, each of the robotic devices 280 and 282 has a corresponding and assigned charging station 290 and 292 such that the number of robotic devices 280 and 282 equals the number of charging stations 290 and 292. In these implementations, the robotic devices 280 and 282 always navigate to the specific charging station assigned to that robotic device. For instance, the robotic device 280 may always use changing station 290 and the robotic device 282 may always use changing station 292.

In some examples, the robotic devices 280 and 282 may share charging stations. For instance, the robotic devices 280 and 282 may use one or more community charging stations that are capable of charging multiple robotic devices 280 and 282. The community charging station may be configured to charge multiple robotic devices 280 and 282 in parallel. The community charging station may be configured to charge multiple robotic devices 280 and 282 in serial such that the multiple robotic devices 280 and 282 take turns charging and, when fully charged, return to a predefined home base or reference location in the property that is not associated with a charger. The number of community charging stations may be less than the number of robotic devices 280 and 282.

Also, the charging stations 290 and 292 may not be assigned to specific robotic devices 280 and 282 and may be capable of charging any of the robotic devices 280 and 282. In this regard, the robotic devices 280 and 282 may use any suitable, unoccupied charging station when not in use. For instance, when one of the robotic devices 280 and 282 has completed an operation or is in need of battery charge, the monitoring system control unit 210 references a stored table of the occupancy status of each charging station and instructs the robotic device to navigate to the nearest charging station that is unoccupied.

The sensors 220, the module 222, the camera 230, the thermostat 234, and the robotic devices 280 and 282 communicate with the controller 212 over communication links 224, 226, 228, 232, 284, and 286. The communication links 224, 226, 228, 232, 284, and 286 may be a wired or wireless data pathway configured to transmit signals from the sensors 220, the module 222, the camera 230, the thermostat 234, and the robotic devices 280 and 282 to the controller 212. The sensors 220, the module 222, the camera 230, the thermostat 234, and the robotic devices 280 and 282 may continuously transmit sensed values to the controller 212, periodically transmit sensed values to the controller 212, or transmit sensed values to the controller 212 in response to a change in a sensed value.

The communication links 224, 226, 228, 232, 284, and 286 may include a local network. The sensors 220, the module 222, the camera 230, the thermostat 234, and the robotic devices 280 and 282 and the controller 212 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 260 is an electronic device configured to provide monitoring services by exchanging electronic communications with the monitoring system control unit 210, the one or more user devices 240, 250, and the central alarm station server 270 over the network 205. For example, the monitoring application server 260 may be configured to monitor events (e.g., alarm events) generated by the monitoring system control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240, 250.

In some examples, the monitoring application server 260 may route alarm data received from the network module 214 or the one or more user devices 240, 250 to the central alarm station server 270. For example, the monitoring application server 260 may transmit the alarm data to the central alarm station server 270 over the network 205.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The central alarm station server 270 is an electronic device configured to provide alarm monitoring service by exchanging communications with the monitoring system control unit 210, the one or more mobile devices 240, 250, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitoring system control unit 210 to receive information regarding alarm events detected by the monitoring system control unit 210. The central alarm station server 270 also may receive information regarding alarm events from the one or more mobile devices 240, 250 and/or the monitoring application server 260.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250, the sensors 220, the module 222, the camera 230, and the robotic devices 280 and 282. The one or more user devices 240, 250 receive data directly from the sensors 220, the module 222, the camera 230, and the robotic devices 280 and 282 and sends data directly to the sensors 220, the module 222, the camera 230, and the robotic devices 280 and 282. The one or more user devices 240, 250 provide the appropriate interfaces/processing to provide visual surveillance and reporting.

In other implementations, the system 200 further includes network 205 and the sensors 220, the module 222, the camera 230, the thermostat 234, and the robotic devices 280 and 282 are configured to communicate sensor and image data to the one or more user devices 240, 250 over network 205 (e.g., the Internet, cellular network, etc.). In yet another implementation, the sensors 220, the module 222, the camera 230, the thermostat 234, and the robotic devices 280 and 282 (or a component, such as a bridge/router) are intelligent enough to change the communication pathway from a direct local pathway when the one or more user devices 240, 250 are in close physical proximity to the sensors 220, the module 222, the camera 230, the thermostat 234, and the robotic devices 280 and 282 to a pathway over network 205 when the one or more user devices 240, 250 are farther from the sensors 220, the module 222, the camera 230, the thermostat 234, and the robotic devices 280 and 282. In some examples, the system leverages GPS information from the one or more user devices 240, 250 to determine whether the one or more user devices 240, 250 are close enough to the sensors 220, the module 222, the camera 230, the thermostat 234, and the robotic devices 280 and 282 to use the direct local pathway or whether the one or more user devices 240, 250 are far enough from the sensors 220, the module 222, the camera 230, the thermostat 234, and the robotic devices 280 and 282 that the pathway over network 205 is required. In other examples, the system leverages status communications (e.g., pinging) between the one or more user devices 240, 250 and the sensors 220, the module 222, the camera 230, the thermostat 234, and the robotic devices 280 and 282 to determine whether communication using the direct local pathway is possible. If communication using the direct local pathway is possible, the one or more user devices 240, 250 communicate with the sensors 220, the module 222, the camera 230, the thermostat 234, and the robotic devices 280 and 282 using the direct local pathway. If communication using the direct local pathway is not possible, the one or more user devices 240, 250 communicate with the sensors 220, the module 222, the camera 230, the thermostat 234, and the robotic devices 280 and 282 using the pathway over network 205.

In some implementations, the system 200 provides end users with access to images captured by the camera 230 to aid in decision making. The system 200 may transmit the images captured by the camera 230 over a wireless WAN network to the user devices 240, 250. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "Away" state, but set not to capture images when the alarm system is armed in a "Stay" state or disarmed. In addition, the camera 230 may be triggered to begin capturing images when the alarm system detects an event, such as an alarm event, a door opening event for a door that leads to an area within a field of view of the camera 230, or motion in the area within the field of view of the camera 230. In other implementations, the camera 230 may capture images continuously, but the captured images may be stored or transmitted over a network when needed.

Further, in some implementations, the system 200 intelligently leverages the robotic devices 280 and 282 to aid in security monitoring, property automation, and property management. For example, the robotic devices 280 and 282 may aid in investigating alarm events detected at the property by the monitoring system control unit 210. In this example, the monitoring system control unit 210 may detect an alarm event (e.g., a fire alarm, an entry into the property when the system is armed "Stay," etc.) and, based on the detected alarm event, control the robotic devices 280 and 282 to attempt to identify persons in the property at the time of the alarm event. Specifically, the monitoring system control unit 210 may send a control command to each of the robotic devices 280 and 282 that causes the robotic devices 280 and 282 to perform a coordinated and automated search for persons in the property. Based on the control command received, each of the robotic devices 280 and 282 begins navigating the property and captures images of the property while navigating. Each of the robotic devices 280 and 282 may execute a predefined navigation pattern within the property or the robotic devices 280 and 282 may execute a coordinated scan of the property in which the robotic devices 280 and 282 exchange location information and navigate to areas that have not been explored by one of the other devices.

In some examples, the robotic devices 280 and 282 may analyze the images captured during the scan of the property for the presence of persons in the captured images. For instance, the robotic devices 280 and 282 may use image processing techniques in an attempt to identify shapes in the captured images that resemble a human body. The robotic devices 280 and 282 also may analyze the images for moving objects (or use other techniques to identify moving objects) and target imaging on capture of moving objects.

Based on detection of a human or a moving object, the robotic devices 280 and 282 may lock onto the human or moving object and follow the human or moving object throughout the property. In this regard, the robotic devices 280 and 282 may follow the human or moving object throughout the property and capture images of the movement. In addition, once one of the robotic devices 280 and 282 locks onto a human or moving object, the robotic devices 280 and 282 coordinate to ensure that multiple of the robotic devices 280 and 282 do not lock onto the same human or moving object. The coordination may be direct amongst the robotic devices 280 and 282 and/or through the monitoring system control unit 210. The coordination may involve sharing the location of the human or moving object and/or attributes of the human or moving object being imaged. Based on the shared location and attributes, the robotic devices 280 and 282 may determine whether multiple robotic devices 280 and 282 have locked onto the same object and take action accordingly. If the robotic devices 280 and 282 determine that the robotic devices 280 and 282 have not locked onto the same object, the appropriate one of the robotic devices 280 and 282 continues to lock onto the object while the other robotic devices scan other areas of the property for other objects. If the robotic devices 280 and 282 determine that the robotic devices 280 and 282 have locked onto the same object, the robotic devices 280 and 282 negotiate to determine which of the robotic devices 280 and 282 will continue to lock onto the object while the other robotic devices stop locking onto the object and scan other areas of the property for other objects. The negotiation may select the robotic device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the robotic devices 280 and 282 may coordinate to hand off tracking of the object to another one of the robotic devices 280 and 282.

In some examples, the robotic devices 280 and 282 perform image recognition processing on the one or more images in an attempt to detect whether any identified humans are legitimate users of the property or intruders. In these examples, the robotic devices 280 and 282 may have access to images of legitimate users of the property and may compare images being captured to the accessed images of legitimate users. Based on the comparison, the robotic devices 280 and 282 use facial recognition techniques to determine whether the imaged user matches a legitimate user of the property or an intruder. The robotic devices 280 and 282 then use the determination of whether the imaged user matches a legitimate user of the property or an intruder to control further tracking operation.

For example, based on a determination that the imaged user is an intruder, the robotic devices 280 and 282 may continue tracking the intruder and ensure that images sufficient to identify the intruder have been captured. In this example, the robotic devices 280 and 282 may attempt to capture biometric data from the intruder, such as voiceprint data, fingerprint data, and/or biological samples with DNA of the intruder. In addition, the robotic devices 280 and 282 may take action to thwart the purpose of the intruder. For example, the robotic devices 280 and 282 may fly in random patterns around the intruder, may play loud sounds near the intruder, may shine lights near the intruder, may output identifying information collected about the intruder (e.g., male, around six feet tall and one hundred eighty pounds), may enable a central station operator or first responder to talk to the intruder through a two-way voice communication session established through the monitoring system control unit 210 and the robotic device, and may take other actions directed to disrupting the intruder.

Alternatively, based on a determination that the imaged user is a legitimate user, the robotic devices 280 and 282 may discontinue tracking the legitimate user and scan for intruders. The robotic devices 280 and 282 also may report the location of the legitimate user. The robotic devices 280 and 282 further may continue tracking the legitimate user and attempt to provide assistance to the user. For instance, if the alarm is a fire alarm event, the robotic devices 280 and 282 may stay near the legitimate user, continuously or periodically update the location of the legitimate user to assist another user or first responder in helping the legitimate user, provide audible reminders of what types of actions should be taken in a fire, enable a central station operator or first responder to talk to the legitimate user through a two-way voice communication session established through the monitoring system control unit 210 and the robotic device, and may take other actions directed to assisting the legitimate user.

In some examples, the robotic devices 280 and 282 may be assigned to different areas of the property where the robotic devices 280 and 282 can move in an unobstructed manner. In these examples, the robotic devices 280 and 282 may be assigned to different levels in a property (e.g., an upstairs robotic device and a downstairs robotic device) and even different rooms or sections that are potentially blocked by doors. The monitoring system control unit 210 coordinate tracking movement based on the assigned areas. For instance, the monitoring system control unit 210 determines areas in a property where an event has been detected (e.g., where motion is sensed, where a door or window is opened, etc.) and only controls the robotic devices assigned to the determined areas to operate. In this regard, the monitoring system control unit 210 may use location of users determined using sensors to control operation of the robotic devices 280 and 282.

In addition, the robotic devices 280 and 282 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 210 may open a door to enable an exterior robotic device to leave and return to the property. For instance, an exterior device may have a base or reference location in a garage of the property and the monitoring system control unit 210 may automatically open a garage door to allow the exterior device to leave the garage and explore the exterior of the property.

In some implementations, the monitoring system control unit 210 may monitor operational status of the robotic devices 280 and 282 and coordinate further operation based on the operational status. In these implementations, the monitoring system control unit 210 may detect that a particular robotic device is no longer operational and control one or more other robotic devices to perform operations originally assigned to the non-operational robotic device. In addition, the monitoring system control unit 210 may determine that the non-operational robotic device was navigating close to an intruder and received an impact based on accelerometer data prior to becoming non-operational. In this case, the monitoring system control unit 210 may infer that the robotic device was smashed by the intruder and control other robotic devices based on the inference. For instance, after inferring a smash event, the monitoring system control unit 210 may control operation of other robotic devices to maintain distance from the intruder by only flying high overhead.

In some implementations, the monitoring system control unit 210 may determine battery power available for each of the robotic devices 280 and 282 and coordinate operation of the robotic devices 280 and 282 based on available battery power. In these implementations, the robotic devices 280 and 282 may report battery power remaining to the monitoring system control unit 210 and the monitoring system control unit 210 may determine a subset of the robotic devices 280 and 282 to deploy based on the battery power information. For instance, the monitoring system control unit 210 may select to initially deploy the robotic device with the most available battery power to allow the other robotic devices to charge while the selected device assists with monitoring. Once the battery power for the selected device falls below a threshold, the monitoring system control unit 210 may return the selected device to a charging station and select the robotic device with the presently highest available battery power to resume the monitoring options being performed. The monitoring system control unit 210 may cycle through all of the robotic devices 280 and 282 in an intelligent manner that best leverages the battery power available. If the battery power of a device becomes too low to effectively operate as a navigating device, the monitoring system control unit 210 may control the robotic device to remain stationary and act as a stationary camera or other sensor to still assist with monitoring, although the added benefit of navigation no longer exists.

In addition to battery, the monitoring system control unit 210 may select the robotic device to deploy and what action to take based on the sensor that triggered the event, a time of day, and a state of the system. For instance, if the monitoring system control unit 210 detects an unusual motion sensor event, the monitoring system control unit 210 may select the nearest robotic device to navigate to an area of the property where motion was detected and investigate. Alternatively, if the monitoring system control unit 210 detects a critical alarm event (e.g., a security breach of a system armed stay, a fire alarm, a carbon monoxide alarm, etc.), the monitoring system control unit 210 may deploy all robotic devices 280 and 282 at any time of the day. If the monitoring system control unit 210 detects an intrusion breach, the monitoring system control unit 210 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 200 allows central station operators, first responders, and/or users of the property to interact with and control the robotic devices 280 and 282. In these implementations, a central station operator, first responder, or user of the property may provide input to control the robotic devices 280 and 282 in a manner that best assists with monitoring and investigation of detected events. For instance, the central station operator, first responder, or user of the property may remotely control navigation of the robotic devices 280 and 282. The central station operator, first responder, or user of the property also may provide general commands related to actions the robotic devices 280 and 282 are designed to take. In response to these general commands, the robotic devices 280 and 282 may automatically perform the desired actions, such as following an instruction to explore the property or following an instruction to navigate to an upstairs bedroom.

In some examples, the robotic devices 280 and 282 may periodically perform test sequences to ensure the robotic devices 280 and 282 will operate correctly if needed. In these examples, the robotic devices 280 and 282 may periodically navigate predefined navigation patterns used to investigate the property and/or may navigate around the property in a scanning sequence. The robotic devices 280 and 282 may determine whether the test sequences perform correctly or whether an error occurs that prevents full investigation of the property. To the extent an error occurs, the robotic devices 280 and 282 report the error and enable a user of the property or a technician to correct the error prior to a time when the robotic devices 280 and 282 would be needed for safety monitoring.

The monitoring system control unit 210 also may arrange the test sequences to occur during periods of time that are convenient for users of the property. For example, the monitoring system control unit 210 may assess sensor data at the property and determine a time period in which the property is unoccupied and unlikely to be occupied until the test sequences complete. In this example, the monitoring system control unit 210 waits until the preferred time period to initiate test sequences for one or more of the robotic devices 280 and 282.

In some examples, the robotic devices 280 and 282 may be used to provide a critical alert to a user in the property or attempt to wake a sleeping person as appropriate. In these examples, none of the users may be responding to a critical alert and, in response, the monitoring system control unit 210 may control the robotic devices 280 and 282 to search for a person in the property and provide the critical alert very close to an identified person in a manner that is highly likely to gain the person's attention to the critical alert. In the event that the person appears to be sleeping in the property, the robotic devices 280 and 282 may attempt to wake the person by providing loud input very near the person and/or by making contact with the person. In this regard, the robotic devices 280 and 282 may be useful in waking a sleeping person when a fire or carbon monoxide alarm has been detected and the person needs to leave the property. The robotic devices 280 and 282 also may determine when a person is nonresponsive (e.g., unconscious) and may be need of immediate assistance. Also, the robotic devices 280 and 282 may serve as an alarm clock for critical meetings based on a person having trouble waking up using traditional alarm clocks.

In some implementations, the robotic devices 280 and 282 may operate as mobile sensors that move throughout the property. In these implementations, the robotic devices 280 and 282 may have temperature sensors that can be used as inputs to a thermostat at the property. In this regard, the robotic devices 280 and 282 may navigate throughout the property and take temperature measurements at various locations in the property. With the temperatures at various locations, the system 200 may identify hot and/or cold spots in the property and adjust thermostat operation accordingly. For instance, the robotic devices 280 and 282 may be deployed to take temperature measurements in areas of the property where people are located and the thermostat may be adjusted to improve the temperature in the location where people are actually located in the property.

In some examples, the robotic devices 280 and 282 may have humidity and air flow sensors in addition to temperature sensors. In these examples, the robotic devices 280 and 282 may periodically navigate throughout the property and take temperature, humidity, and air flow measurements at various locations throughout the property. The system 200 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

Figure 3:
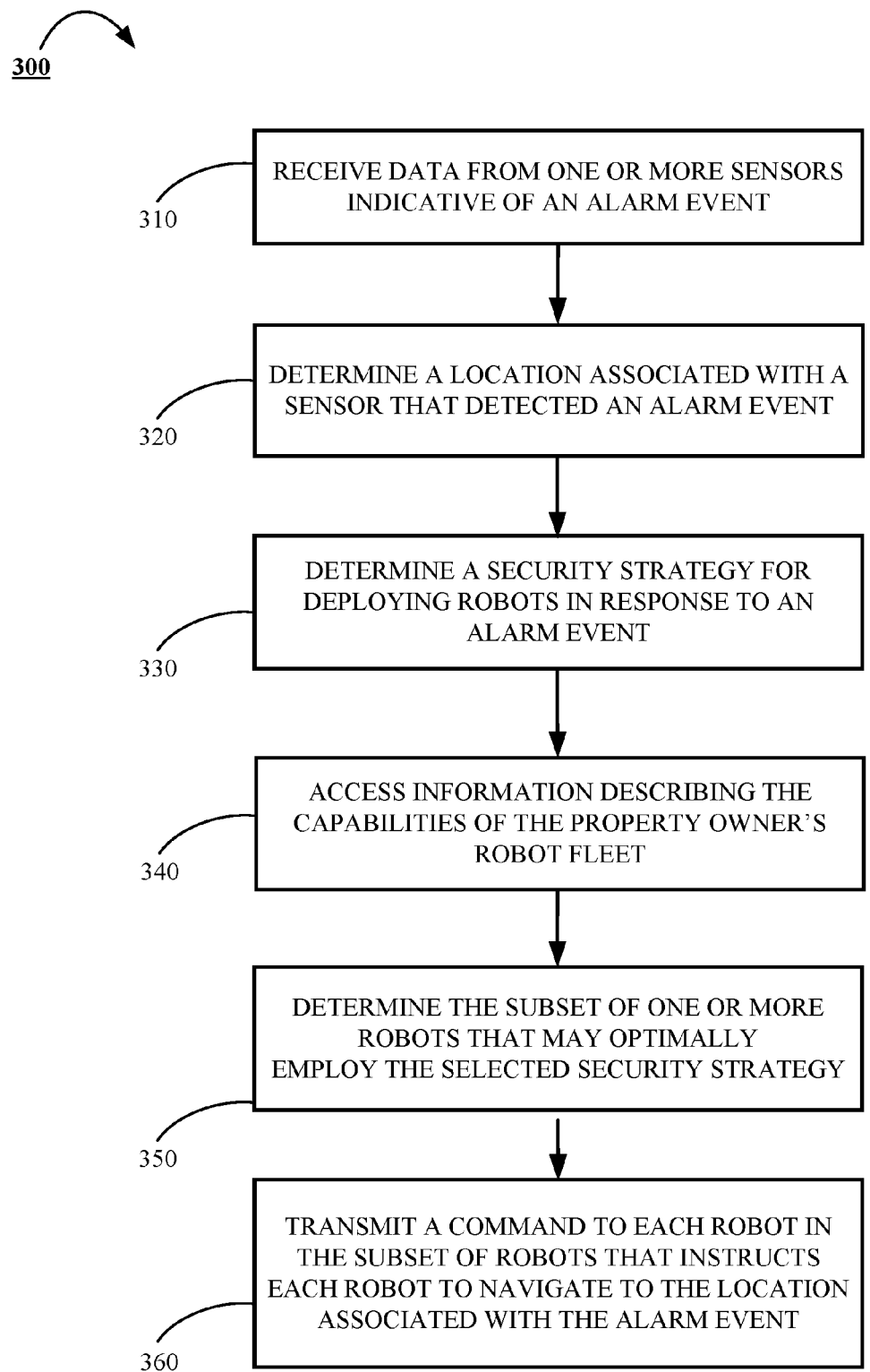
FIG. 3 is a flowchart of an example of a process for using one or more robotic devices to aid in security monitoring.

FIG. 3 is a flowchart of an example of a process 300 for using one or more robotic devices 280, 282 to aid in security monitoring.

The process 300 may begin at 310 when a monitor control unit 210 receives data from one or more sensors that may be indicative of an alarm event. The data may include an alarm event notification that comprises, for example, an identifier of the sensor 220 that broadcast the alarm event notification. In some implementations, the alarm event notification may also include a location of the sensor 220. The alarm event notification may also include information regarding the severity of the alarm event. For instance, a sensor 220 may be able to measure the force with which a window was broken. Alternatively, or in addition, for example, the sensor 220 may be able to determine the number of objects moving in the vicinity of sensor 220. The alarm event notification may include raw data that may be indicative of the severity of the alarm event, or a scaled score on a rating scale (e.g., 1 through 10) that may be indicative of the severity of the alarm event.

The monitor control unit 210 may analyze the data received at 310. For instance, the monitor control unit 210 may analyze the data received at 310 to determine 320 the location associated with a sensor 220 that detected an alarm event. The monitor control unit 210 may determine the location of the sensor 220 by, for example, obtaining the location of the sensor 220 from the data received at 310. Alternatively, the monitor control unit 210 may access stored sensor information that the monitor control unit 210 maintains. The stored sensor information may include a table of sensor 220 locations organized by sensor identifiers. In some implementations, the monitor control unit may be able to map a received sensor identifier to a sensor location using the data maintained in the table of sensor locations. The table of sensor 220 locations may be populated at the time each sensor 220 is installed. The table of sensor 220 locations may also be updated in the event that a particular sensor 220 is moved, replaced, or the like.

The monitor control unit 210 may determine a security strategy for deploying robot devices 280, 282 in response to an alarm event notification at 330. The security strategy may include a deterrence based security strategy or an active engagement, or confrontation, based security strategy. The monitor control unit 210 may determine whether a deterrence or confrontation based security strategy should be employed based on an evaluation of the threat posed by one or more alarm event notifications. For instance, the monitor control unit 210 may select a deterrence based security strategy in response to alarm event notifications indicative of a menacing intruder positioned outside a property such as, for example, the burglar 140a of property 101. Alternatively, for example, the monitor control unit 210 may select an active engagement, or confrontation, based security strategy in response to alarm event notifications indicative of a menacing intruder positioned inside a property such as, for example the burglar 140b of property 101. Other factors may be considered by monitor control unit 210 in determining between a deterrence based strategy and an active engagement, or confrontation, based strategy.

For instance, the monitor control unit 210 may consider information contained in an alarm event notification such as, for example, the amount of force applied to a window, door, or other entry point when a menacing intruder attempts to break-in to a property 101. If a sensor 220 detects that an applied amount of force exceeds a predetermined threshold, then an active engagement, or confrontation, based security strategy may be selected. Alternatively, if a sensor 220 detects that an applied amount of force does not exceed a predetermined threshold, then a deterrence based security strategy may be employed. The amount of force detected by a sensor 220 may be broadcast by a sensor 220 as part of an alarm event notification. Similar threat measurements may also be determined, and broadcast by, other sensors 220. For instance, certain security strategy determining thresholds may also be established based on the number of moving objects detected by one or more motion sensors. For instance, if the number of moving objects detected around an external perimeter of a property 101 exceeds a predetermined threshold, an active engagement, or confrontation, based strategy may be adopted instead of the deterrence based strategy that may typically be employed for threats existing outside of the property 101.

Monitor control unit 210 may consider other factors in determining the type of security strategy to employ. For instance, the monitor control unit 210 may determine that a more, or less, aggressive security strategy may need to be employed based on the time of day. In such instances, the monitor control unit 210 may determine that an active engagement, or confrontation, based security strategy should be employed for attempted property invasions that occur at night, regardless of whether the burglar 140c was successful in gaining entry to the property 101. Alternatively, the monitor control unit 210 may determine that a deterrence based security strategy should be employed for the same attempted property invasion if the attempted property invasion occurred during the middle of the day, in daylight.

The monitor control unit 210 may also consider the state of the security monitoring system 100 in determining the type of security strategy to employ. For instance, a monitor control unit 210 may determine an active engagement, or confrontation, based security strategy should be employed for each subsequent alarm event notification that is received subsequent to an initial alarm event notification. Alternatively, for example, a monitor control unit 210 may determine that a more aggressive security strategy may be selected for alarm event notifications that are received after a security monitoring system 100 has been in a state of responding to alarm event notifications for longer than a predetermined time threshold. For instance, if a home invasion detected by one or more alarm event notifications continues to persist for longer than 1 minute, 2 minutes, 3 minutes, or the like, the monitor control unit 102 may select a more aggressive security strategy. Yet other factors may also be considered in determining an appropriate security strategy. It is also considered that various other types of security strategies may be employed that vary in aggressiveness in addition to the particular security strategies described herein.

Determinations regarding the type of security strategy that may be selected may also be based on an input received from a property occupant 150. For instance, a property occupant 150 may submit a command to monitor control unit 210 via a mobile device 152 to request a particular security strategy type. For instance, the property occupant 150 may be monitoring a property invasion by one or more burglars 140a, 140b, 140c using the property occupant's 150 virtual reality headset 154. The virtual reality headset 154 may be configured to receive real-time video feeds from one or more dedicated cameras 230 and/or one or more cameras associated with a particular robotic device 280, 282. Based on the particular scenario observed in real-time using the virtual reality headset 154, a property occupant may request an increase, or decrease, in the aggressiveness of the security strategy being used to respond to a property invasion attempt. For example, a property occupant 150 may request a deterrence based security strategy, an active engagement, or confrontation, based security strategy, or some other security strategy that may fall somewhere above, below, or in-between each aforementioned type of security strategy with respect to a level of aggressiveness employed by the strategy.

At 340, the monitor control unit 210 may access information describing the capabilities of each robotic device 280, 282 in a property occupant's fleet of robotic devices. In some implementations, the information describing the capabilities of each robotic device 280, 282 may be organized based on a robotic device identifier. For instance, each robotic device identifier may be associated with one or more capabilities. The capabilities may be indicative of the capabilities of the particular robotic device that corresponds to the particular robotic device identifier. The robotic device capabilities may include data indicating each tool with which a particular robotic device is equipped. Alternatively, or in addition, the robotic device capabilities may also include the battery level of a particular robotic device. Alternatively, or in addition, the robotic device capabilities may also include the maximum speed of the robotic device and the current location of the robotic device. The maximum speed and current location of the robotic device 280, 282 may be utilized to determine whether a robotic device 280, 282 is capable of arriving at a predetermined location in a sufficient amount of time. Alternatively, such information may be used to determine which robotic device may arrive at an alarm event location the fastest. In some implementations, each robotic device may periodically update the monitor control unit 210 regarding the robotic device's current location. Alternatively, the monitor control unit 210 may periodically request the current location of each robotic device in the fleet.

The monitor control unit 210 may then determine at 350 the subset of one or more robotic devices 280, 282 that may optimally employ the selected strategy. For instance, the monitor control unit 210 may select a subset of robotic devices 280, 282 that may be equipped with biometric scanners, facial recognition cameras, and/or holographic projectors in the event a deterrence based strategy is selected. Alternatively, for example, the monitor control unit 210 may select a subset of robotic devices 280, 282 that may be equipped with extremely loud audio output devices, extremely bright lights, and/or tasers if an active engagement, or confrontation, based strategy is selected. However, it is also contemplated that a particular subset of robotic devices 280, 282 may be selected that may be equipped with one or more of these tools for either a deterrence based strategy or an active engagement, or confrontation, based strategy. In such instances, the monitor control unit 210 may instruct each particular robotic device 280, 282 in the subset of robotic devices to only utilize a subset of the equipped tools that may be appropriate for implementing the selected security strategy.

At 360, the monitor control unit 210 may transmit a deployment command to each robotic device in the determined subset of robotic devices to initiate deployment of the robotic devices 280, 282. Each deployment command may include, for example, the location of a sensor 220 that broadcast an alarm event notification. The location in the deployment command may serve as a security assignment for a particular robotic device 280, 282. Each robotic device 280, 282 may then deploy to investigate the current state of the threat that exists at the assigned location.

The deployment command transmitted at 360 may include other information in addition to the location of the sensor 220 that broadcast a particular alert event notification. For instance, the deployment command may include one or more instructions that the robotic device is to follow when the robotic device arrives that the location provided in the command. For example, a robotic device may be instructed to "navigate to Room A, and project a holographic image 112a." Alternatively, or in addition, a robotic device may be instructed to "navigate to Room B, and play extremely loud audio signals 112d." In other implementations, the deployment command may also provide an indication as to whether or not the object that triggered the alert event notification is known to be a menacing intruder. If the deployment command includes such information, a robotic device 280, 282 may bypass certain operations that may be employed to determine the identity of the object that triggered the alarm event notification. A vast amount of other instructions may be provided to each robotic device 280, 282, based on the capabilities of the robotic device 280, 282. The instructions may be provided to the robotic device 280, 282 in the command at 360 from the monitor control unit 210, or in other commands received by an operator, occupant of property 150, law enforcement officer, or the like.

Figure 4:
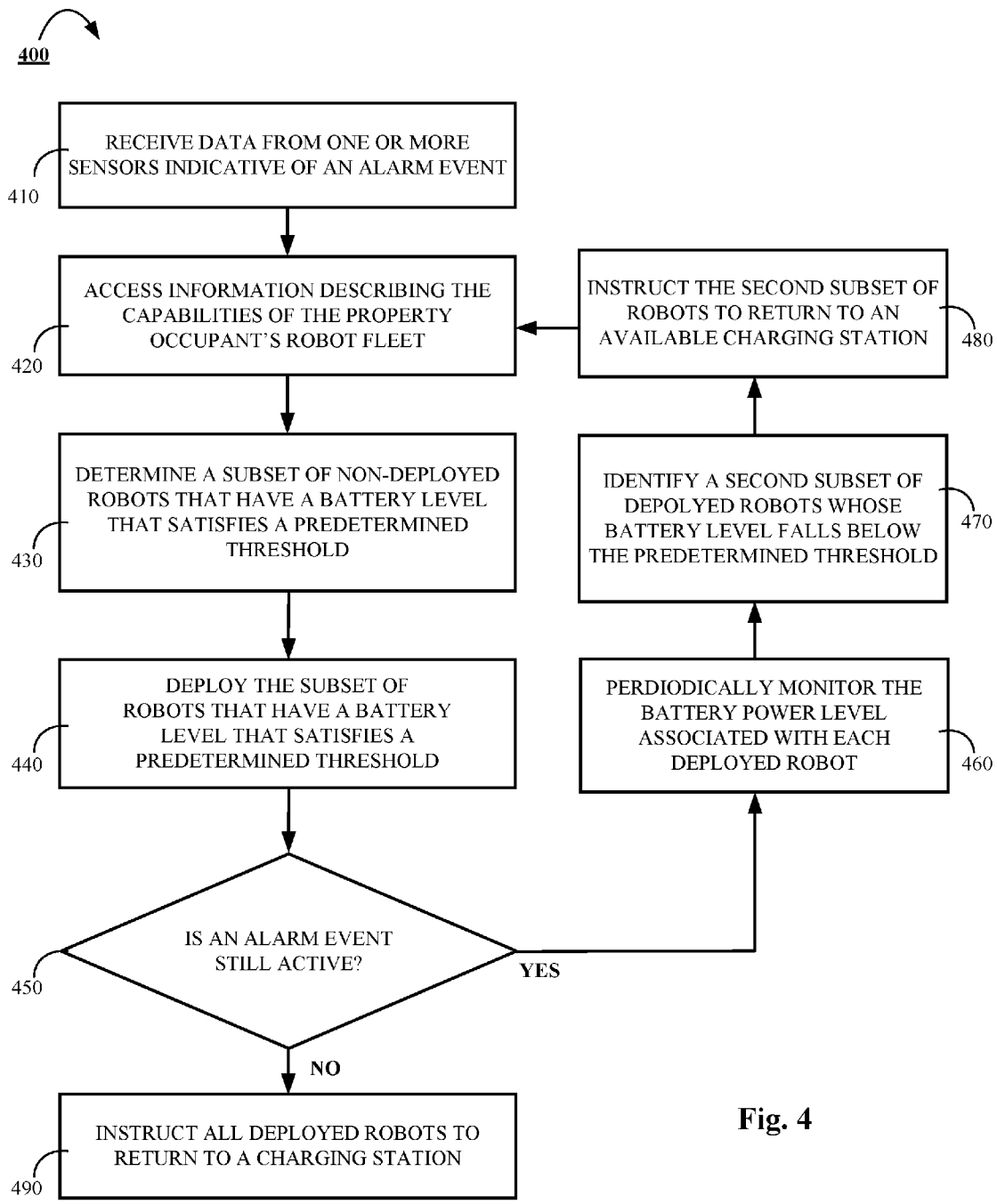
FIG. 4 is a flowchart of an example of a process for dispatching one or more robotic devices to aid in security monitoring based on each respective robotic device's battery level.

FIG. 4 is a flowchart of an example of a process 400 for dispatching one or more robotic devices 280, 282 to aid in security monitoring based on each respective robotic device's 280, 282 battery level. The process 400 may be used alone, or in combination with one or more other processes such as process 300.

The process 400 may begin at 410 when a monitor control unit 210 receives data from one or more sensors that may be indicative of an alarm event. The received data may include, for example, an alarm event notification, as previously described herein. At 420, the monitor control unit 210 may access information describing the capabilities of each robotic device 280, 282 in a property occupant's fleet of robotic devices. In some implementations, the information describing the capabilities of each robotic device 280, 282 may be organized based on a robotic device identifier. In one implementation, the robotic device capabilities stored, and maintained, by the monitor control unit 210 may include the battery level of each robotic device 280, 282.

The monitor control unit 210 may analyze the battery level of each robotic device 280, 282. Such information may be used to make robotic device deployment decisions to ensure that each robotic device 280, 282 has sufficient power to perform tasks that may be requested of each respective robotic device 280, 282 in accordance with a selected security strategy. Accordingly, a subset of non-deployed robotic devices may be selected for deployment based on the battery level associated with each robotic device. In one implementation, the monitor control unit 210 may select 430 the subset of non-deployed robotic devices 280, 282 that have a battery level that satisfies a predetermined battery level threshold.

At 440, the monitor control unit 210 may transmit a command to deploy the subset of robotic devices 280, 282 that have a battery level that satisfies a predetermined battery level threshold. Each deployed robotic device may be assigned a particular location of a particular sensor 220 that has broadcasted an alarm event notification. Once each robotic device arrives at each respective location, the robotic devices may investigate the current state of the threat detected by the sensor 220 in accordance with the assigned security policy. Each deployed robotic device 280, 282 may periodically determine 250 whether the alarm event associated with the particular location under investigation is still active.

If one or more alarm events are still active at 250, the monitor control unit 210 may continue to periodically monitor 460 the battery level associated with each deployed robotic device 280, 282. For instance, each robotic device 280, 282 may be configured to report the current status of its corresponding battery level to the monitor control unit 210 every minute, every 5 minutes, every 10 minutes, or the like. Alternatively, monitor control unit 210 may request the battery level from each deployed robotic device 280, 282 every minute, every 5 minutes, every 10 minutes, or the like.

The monitor control unit 210 may periodically update robotic device capability information as the monitor control unit 210 receives updated battery level status information from each deployed robotic device 280, 282. The monitor control unit 210 may analyze the updated battery level status information from each deployed robotic device 280, 282, and then identify 470 a second subset of deployed robotic devices that are associated with a battery level that has fallen below a predetermined battery level threshold. The monitor control unit 210 may then send a command 480 to each robotic device in the second subset of deployed robotic devices to navigate to an available charging station 290, 292. The process 400 may then continue at step 420, wherein the monitor control unit 210 may then access robotic device 280, 282 capability information, and then determine a subset of non-deployed robotic devices that may replace the second subset of deployed robotic devices that were recalled because their corresponding battery level fell below a predetermined battery level threshold. The steps of 420, 430, 440, 450, 460, 470 and 480 may be performed in a controlled loop while active alarm events are detected by monitor control unit 210.

Alternatively, it may be determined at 450 that there is no longer any active alarm events. If, at 450 it is determined that there is not any active alarm events, the monitor control unit 210 may instruct all deployed robotic devices 280, 282 to return to a charging station 290, 292.

Figure 5:
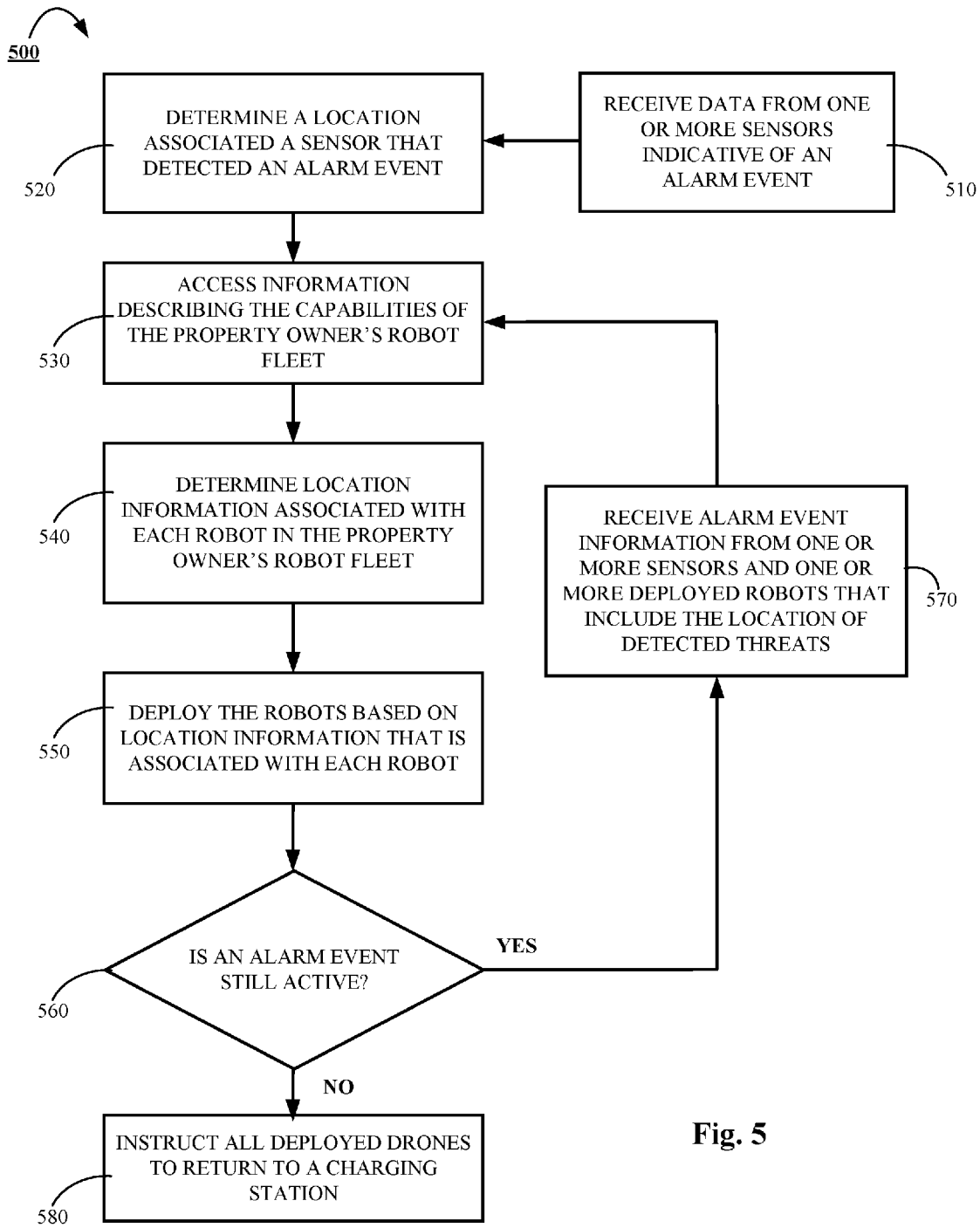
FIG. 5 is a flowchart of an example of a process for dispatching one or more robotic devices to aid in security monitoring based on the location of an alarm event.

FIG. 5 is a flowchart of an example of a process 500 for dispatching one or more robotic devices 280, 282 to aid in security monitoring based on the location of an alarm event. The process 500 may be used alone, or in combination with one or more other processes such as process 300.

The process 500 may begin at step 510 when a monitor control unit 210 receives data from one or more sensors 220 that may be indicative of an alarm event. The received data may include, for example, an alarm event notification, as previously described herein. At 520, the monitor control unit 520 may determine the location associated with a sensor that broadcast the data received at 510. Then, the monitor control unit 210 may access 530 information describing the capabilities of each robotic device 280, 282 in a property occupant's fleet of robotic devices.

In some implementations, the information describing the capabilities of each robotic device 280, 282 may be organized based on a robotic device identifier. The capabilities may be indicative of the capabilities of the particular robotic device that corresponds to the particular robotic device identifier. In one aspect, the robotic device capabilities may include the maximum speed of the robotic device and/or the current location of the device. The current location for each robotic device 280, 282 may be periodically updated based on movements of each robotic device 280, 282. Such updated locations may be periodically reported by each robotic device 280, 282. Alternatively, the monitor control unit may periodically request the location of each robotic device 280, 282. The monitor control unit 210 may utilize the robotic device capability information in order to determine 540 the current location associated with each robotic device 280, 282.

The monitor control unit 210 may deploy 550 one or more of the robotic devices 280, 282 based on location information that is associated with each robotic device 280, 282. For instance, the monitor control unit 210 may compare the current location of each robotic device 280, 282 with the current location of a sensor 220 that broadcast an alarm event notification, as determined at 520. The monitor control unit 210 may then identify a subset of robotic devices that are closest in proximity to the sensor 220, based on the comparison. Then, the monitor control unit 210 may instruct the closest robotic device to the sensor 220, or two or more of the closest robotic devices to sensor 220, to navigate to the location associated with sensor 220 to investigate the alarm event. Such a location-based deployment may allow a monitor control unit 210 to provide rapid response robotic device deployments by deploying the closest robotic device 280, 282 to a location associated with a particular sensor 220 that broadcast an alarm event notification. In such instances, monitor control unit 210 may make its deployment decision based solely on location as opposed to any particular tool with which one or more robotic devices may be equipped.

Once one or more robotic devices 280, 282 are deployed at 550, the monitor control unit 210 may periodically monitor the current locations of both sensors 220 that are broadcasting alarm event notifications and one or more robotic devices 280, 282. For instance, the monitor control unit 210 may receive 570 alarm event notifications from one or more sensors 220 and/or sensors residing on one or more deployed robotic device 280, 282. The alarm event notifications may include a location of the sensor or robotic device, respectively. After the location information maintained by monitor control unit 210 is updated, the process may continue to step 530, and then continue to repeat the steps 530, 540, 550, 560, and 570 in a controlled loop until it is determined at 560 that there are no longer any active alarm events. If, at 560 it is determined that there are not any active alarm events, the monitor control unit 210 may instruct 580 all deployed robotic devices 280, 282 to return to a charging station 290, 292.

Figure 6:
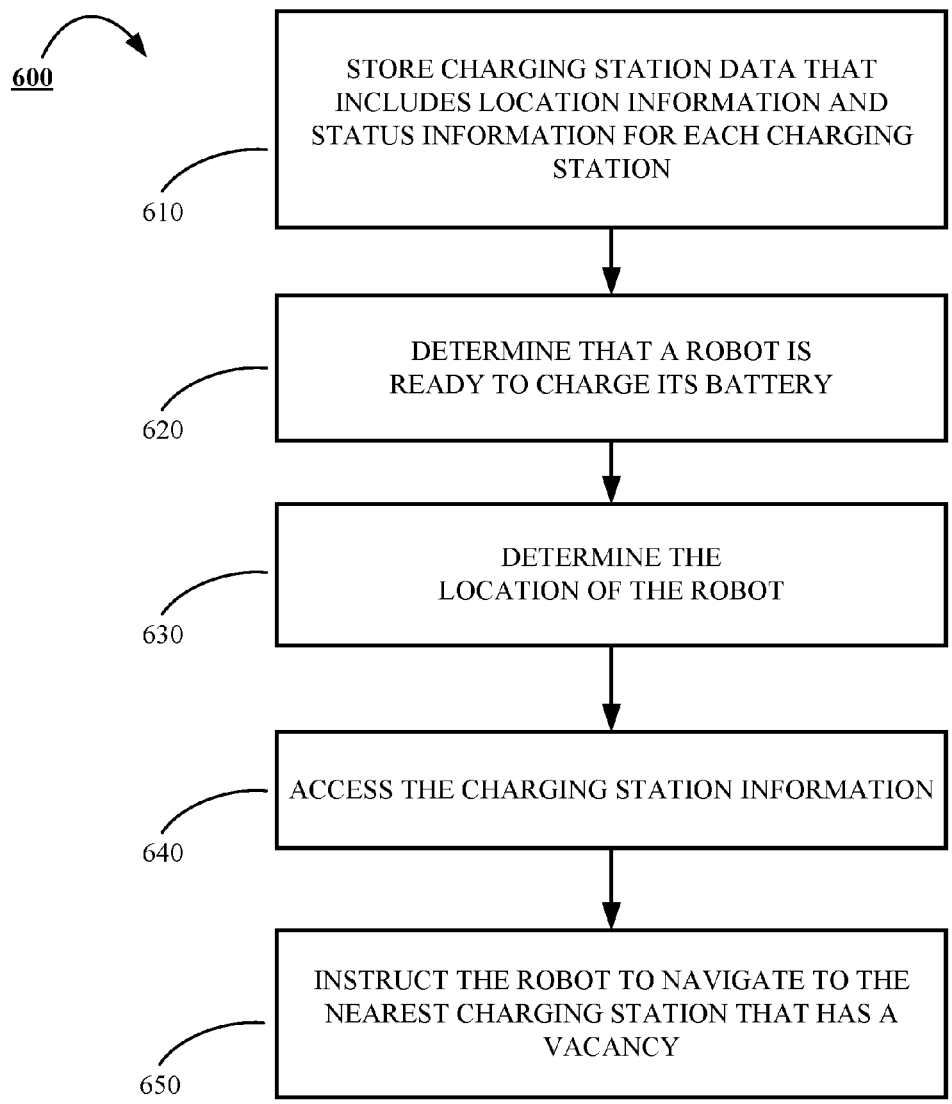
FIG. 6 is a flowchart of an example of a process for recharging one or more robotic devices without assigned charging stations.

FIG. 6 is a flowchart of an example of a process 600 for recharging one or more robotic devices 280, 282 without assigned charging stations.

The process 600 may begin at 610 by using the monitor control unit 210 to store data associated with each charging station 290, 292. For instance, the monitor control unit 210 may store charging station location information and charging station status information for each charging station 290, 292. The charging station location information may provide an indication as to the location of a particular charging station 290, 292 within a property 101. The charging station location information may be stored when the charging station 290, 292 is installed at a property 101. For instance, a technician may use a mobile device to transmit a charging station identifier and charging station location to a monitor control unit 210 when the technician installs the charging station. Alternatively, any other user may similarly transmit a charging station identifier and charging station location to a monitor control unit 210 at any time using a mobile device in a similar manner. For instance, the lawful occupant 150 of property 101 may decide to relocate an installed charging station at some point in time after installation of the charging station. The lawful occupant 150 may then use a mobile device 152 to update the charging station location information stored in the monitor control unit 210 at the time of relocation of the charging station.

The charging station status information may include, for example, information that indicates whether a charging station 290, 292 is currently occupied. Alternatively, certain charging stations may be large, multi-unit charging stations that may be capable of charging more than one robotic device 280, 282 at any particular time. In such implementations, the status information may indicate whether each charging station has an available vacancy available to charge an additional one or more robotic devices. The charging station status information may be periodically updated in response to the expiration of defined intervals of time such as, for example, every minute, every 5 minutes, every 10 minutes, or the like. Charging station status information may be obtained by the monitor control unit 210 polling each charging station for current occupancy information. Alternatively, each charging station may be configured to report its respective occupancy information in response to the expiration of a predetermined period of time. Alternatively, a charging station may transmit a notification to the monitor control unit 210 when a vacancy at the charging station becomes available.

At 620 the monitor control unit 210 may determine that a robotic device 280, 282 is ready to charge its battery. For instance, a robotic device may be ready to charge its battery when the robotic device's battery level falls below a predetermined battery level threshold. The monitor control unit may then determine 630 the location of a robotic device 280, 282. The location of a robotic device may be determined by accessing robotic device capability information stored by the monitor control unit 210. Then, the monitor control unit 210 may determine which charging station 290, 292 may be available to charge the robotic device.

The monitor control unit 210 may access 640 the stored charging station data to determine the subset of charging stations 290, 292 that may be available to charge a robotic device. A charging station 290, 292 may be available to charge a robotic device 280, 282 if the charging station 290, 292 is not occupied. Alternatively, a charging station 290, 292 may be available to charge a robotic device 280, 282 if the charging station 290, 292 has at least one vacancy. Next, the monitor control unit 210 may further analyze the charging station data to determine a charging station 290, 292 that is located nearest to the robotic device 280, 282 that is ready to charge its battery. The monitor control unit 210 may then transmit 650 an instruction to the robotic device 280, 282 in need of a battery charge to navigate to the unoccupied, or vacant, charging station 290, 292. Utilizing the process 600 may facilitate charging of robotic devices 280, 282 without assigning robotic devices 280, 282 to dedicated charging stations 290, 292.

Figure 7:
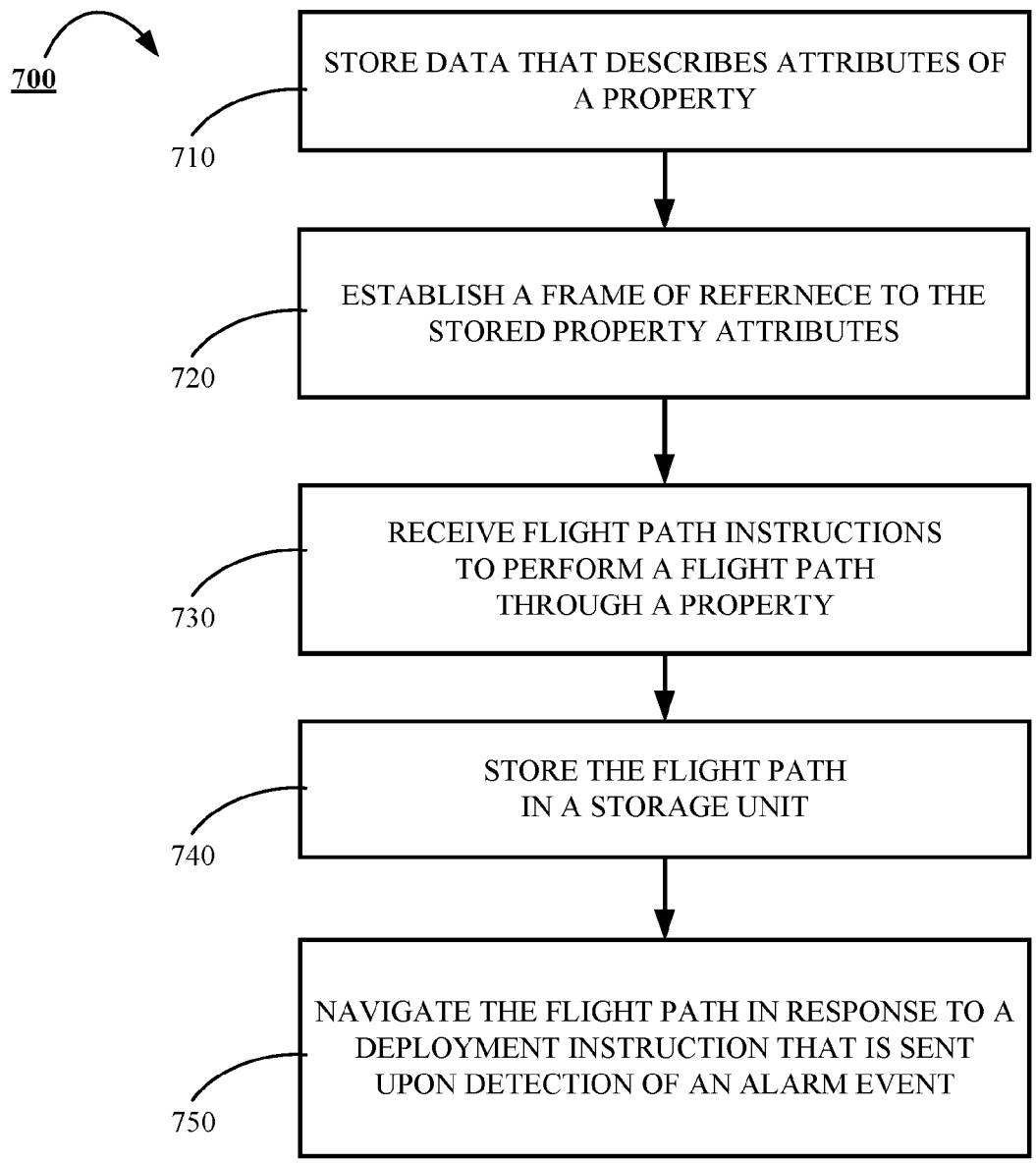
FIG. 7 is a flowchart of an example of a process for configuring one or more robotic devices to execute predetermined flight patterns.

FIG. 7 is a flowchart of an example of a process 700 for configuring one or more robotic devices 280, 282 to execute predetermined flight patterns.

The process 700 may begin by storing data that describes a property such as, for example, property 101 in the local memory of a robotic device 280, 282. The data describing the property may include, for example, a floorplan of the property, a three-dimensional model of the property, and/or any other type of model that enables the robotic device 280, 282 to navigate the property. Next, the robotic device 280, 282 may be configured to establish 720 a particular frame of reference amongst the property attributes. For instance, initialization of the robotic device 280, 282 may assign a particular location within the property model as a home location, a reference location, or the like. Alternatively, or in addition, a property occupant 150 may use a mobile device 152 to set the home location, reference location, or the like. The robotic device 280, 282 may later navigate the property based on the stored property model by measuring its movements relative to the home location, reference location or the like.

A particular navigation pattern may be learned by a robotic device 280, 282 at the time of initial configuration of the robotic device 280, 282, or at any time thereafter. For example, a robotic device 280, 282 may be configured to receive 730 instructions to perform a particular flight path through a property. The instructions may include, for example, a set of instructions that are intended to guide a robotic device 280, 282 through a property such as, property 101, by referencing a stored property model comprising attributes of the property. For example, a particular flight path instruction for property 101 may include, for example, "take off from charging station 110a, fly out window 105d, circle the property 101 four times capturing video of the premises, and then return to the nearest charging station with a vacancy." Alternatively, for example, a particular flight path instruction for property 101 may include, for example "take off from charging station 110a, fly out window 105d, and circle the property 101 capturing video while there is an outstanding alarm event." Alternatively, for example, a particular flight path instruction for property 101 may include, for example, "fly up the stairs in Room A into Room C, spin around while capturing video of Room C, and then return to a charging station in Room D." Other types of flight path instructions may be provided to a robotic device 280, 282. Such other types of flight path instructions may be customized to the particular property attributes associated with each property where a particular robotic device 280, 282 is being employed.

The flight path instructions may be stored 740 in a local memory of a robotic device 280, 282 so that the flight path instructions may be retrieved and used by the robotic device 280, 282 to navigate 750 the flight path at some point in the future. For instance, a robotic device 280, 282 may be instructed by a monitor control unit 210 to retrieve, and execute, the stored flight path in response to the detection of an alarm event notification. Alternatively, the robotic device 280, 282 may be configured to retrieve, and execute, the stored flight path instructions in response to a specific request from a property occupant 150. For instance, property occupant 150 may hear a noise outside late at night. In response to the noise, the property occupant may submit a command using the property occupant's 150 mobile device 152 to instruct a robotic device 108i to retrieve, and execute, a predefined surveillance flight path which sets forth a navigation pattern that includes "take off from charging station 110a, fly out window 105d, circle the property 101 four times capturing video of the premises, and then return to the nearest charging station with a vacancy." The video captured by the robotic device 108i may be streamed to the property occupant's 150 virtual reality headset 154. Thus, in short order, a property occupant 150 may quickly surveil his/her property to safely discover the source of the noise while being safe and secure in Room C. Different flight paths may be employed to investigate potential security hazards in other aspects of property 101 in a similar manner.

Retrieval, and execution, of a predetermined flight path may also be initiated automatically by a robotic device 280, 282. For instance, a robotic device 280, 282 may be equipped with a sensor that detects an alarm event. In such a scenario, the robotic device 280, 282 may be configured to automatically retrieve, and execute, a predetermined flight path.

Figure 8:
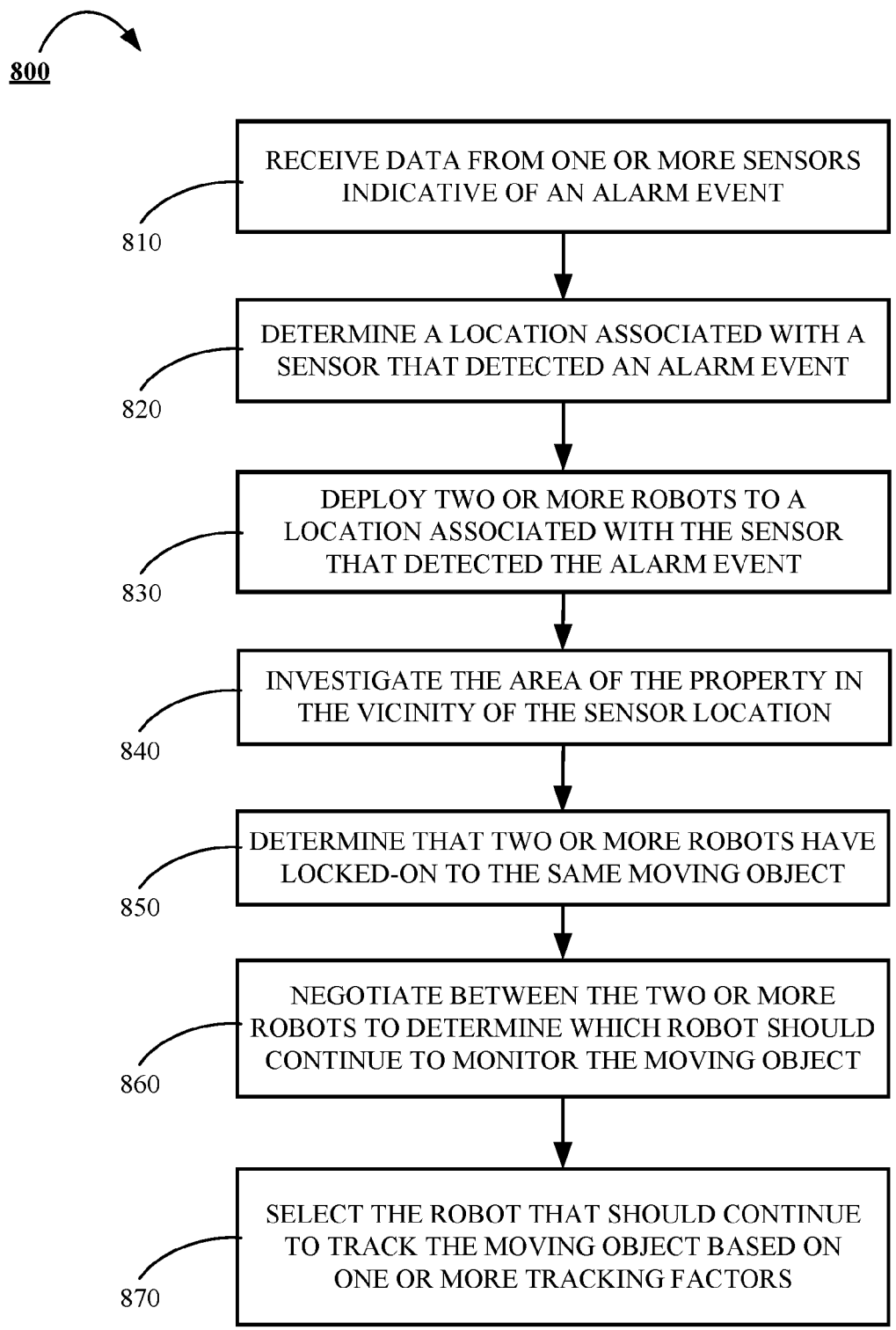
FIG. 8 is a flowchart of an example of a process for tracking a particular object identified by two or more robotic devices.

FIG. 8 is a flowchart of an example of a process 800 for tracking a particular object identified by two or more robotic devices 280, 282.

The process 800 may begin at step 810 when a monitor control unit 210 receives data from one or more sensors 220 that may be indicative of an alarm event. The received data may include, for example, an alarm event notification, as previously described herein. At 820, the monitor control unit 210 may determine the location associated with a sensor 220 that broadcast the data received at 810. The monitor control unit 210 may then deploy two or more robotic devices 280, 282 to the location associated with the sensor 220 that detected the alarm event, and broadcast the data received at 810.

The deployed robotic devices 280, 282 may investigate 840 the area of the property in the vicinity of the location of the sensor 220 that detected the alarm event. The investigation may include each deployed robotic device 280, 282 scanning the vicinity around the sensor location for any signs of an unauthorized object. Scanning the vicinity for an unauthorized object may include, for example, using a robotic device's 280, 282 camera to take images of the vicinity of the sensor 220 and analyzing the images for the presence of an object such as, for example, the presence of a person. Each robotic device 280, 282 may utilize image processing techniques to identify shapes in captured images that may resemble a human body. Similar image processing techniques may also be used to determine if a detected object has moved. Each deployed robotic device 280, 282 may "lock-on" to a moving object that has been detected, and then follow the moving object throughout the property such as, for example, property 101.

When multiple robotic devices are deployed to detect, and track, a menacing intruder such as, burglar 140c, it may be determined 850 that two or more robotic devices 108e, 180f, 108g, 108h have locked-on to the same moving object (e.g., burglar 140c). In some instances, it may be beneficial for multiple robotic devices to lock-on to a single moving object. For example, multiple robotic devices 108e, 180f, 108g, 108h may lock onto a burglar 140c when a swarm is being implemented. However, other scenarios may exist where it may be beneficial for the multiple robotic devices 108e, 180f, 108g, 108h to negotiate 860 amongst themselves to determine which robotic device should continue to monitor the moving object, and which robotic devices should move on to address other threats. For instance, such negotiation may be beneficial when multiple alarm events and/or multiple menacing intruders are identified as converging on the property 101 at the same time. In such a scenario, the robotic devices 108e, 180f, 108g, 108h may communicate with each other in order to best surveil, and protect, the property 101.

The multiple robotic devices 108e, 180f, 108g, 108h may communicate with one another via a short wave RF interface, a cellular data network, or the like. The robotic devices 108e, 180f, 108g, 108h may also utilize a WiFi network if the robotic devices 108e, 180f, 108g, 108h are close enough to the property 101 to detect the property's 101 WiFi network. The robotic devices may negotiate 860 based on a variety of factors in order to select the particular robotic device from the set of robotic devices 108e, 180f, 108g, 108h that should continue to monitor the burglar 140c. The factors the robotic devices 108e, 180f, 108g, 108h may consider include the timing when each respective robotic device 108e, 180f, 108g, 108h locked onto the burglar 140c, the positioning of each respective robotic device 108e, 180f, 108g, 108h relative to the burglar 140c, the amount of battery power remaining for each respective robotic device 108e, 180f, 108g, 108h, or the like. Based on an analysis of the aforementioned factors, or other similar factors, the robotic devices 108e, 180f, 108g, 108h may select 870 the a particular robotic device to track the burglar 140c, while the remaining robotic devices pursue burglars 140a, 140b.

The selection of the particular robotic device from the set of robotic devices 108e, 180f, 108g, 108h may be based on a weight analysis of each of the aforementioned factors. For instance, available battery power and positioning relative to the burglar 140c may be weighted as more important factors than the timing in which the robotic devices locked onto the burglar 140c. Accordingly, in one implementation, the robotic device that has the most available batter power and is positioned closest to the burglar 140c may be selected to continue tracking the burglar 140c, while the other robotic devices disperse to pursue other threats.

Figure 9:
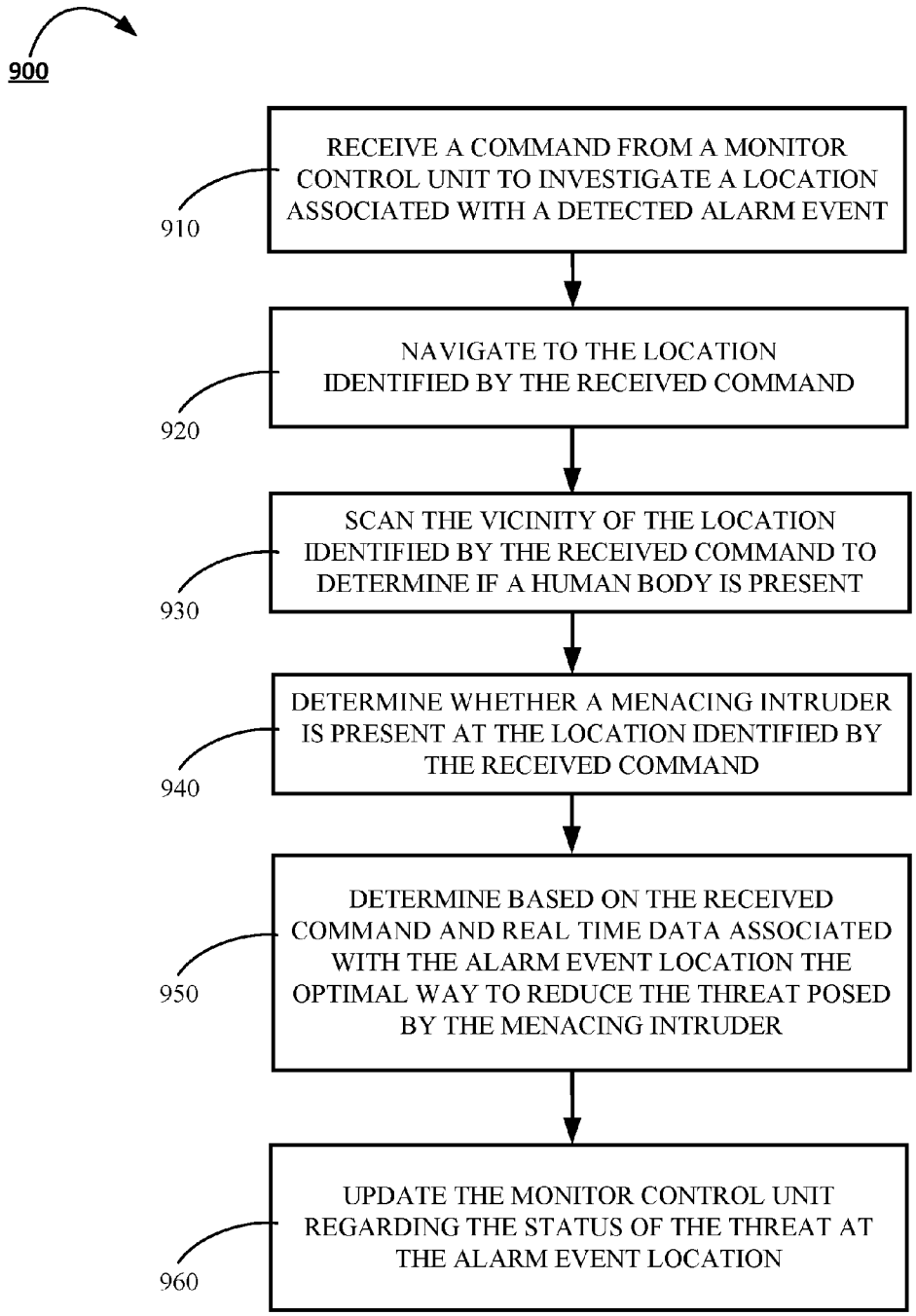
FIG. 9 is a flowchart of an example of a process for using one or more robotic devices to select a security strategy based on real-time data associated with an alarm event location.

FIG. 9 is a flowchart of an example of a process 900 for using one or more robotic devices 280, 282 to select a security strategy based on real-time data associated with an alarm event location.

The process 900 may begin at 910 when a robotic device 280, 282 receives a command from a monitor control unit 910 to investigate a location associated with a detected alarm event. The location to be investigated may include, for example, a vicinity around a sensor 220 that broadcast an alert event notification that was received by the monitor control unit 210. The robotic device 280, 282 may navigate 910 to the location indicated by the command received at 910.

The deployed robotic device 280, 282 may investigate the vicinity of the location identified by the command received at 910 in order to determine 930 whether a menacing intruder is present at the location, or near vicinity. The investigation may include the deployed robotic device 280, 282 scanning the vicinity around the sensor location. Scanning 930 the vicinity around the sensor location may include, for example, using a robotic device's 280, 282 camera to take images of the vicinity of the sensor 220 location and analyzing the images for the presence of an object such as, for example, the presence of a person. Each robotic device 280, 282 may utilize image processing techniques to identify shapes in captured images that may resemble a human body. Similar image processing techniques may also be used to determine if a detected object has moved, or is currently moving. Each deployed robotic device 280, 282 may "lock-on" to a moving object that has been detected, and then follow the moving object throughout the property such as, for example, property 101.

If a human body is identified during scanning 930, the robotic device 280, 282 may determine 940 whether the human body is a menacing intruder, or a lawful occupant of the property. The robotic device 280, 282 may be equipped with one or more tools to make such a determination. For instance, a robotic device 280, 282 may be equipped with one or more biometric scanners, cameras capable of facial recognition, microphones capable of obtaining voiceprints, or the like. Robotic device 280, 282 may compare biometric data, facial recognition scans, voiceprints, or the like against samples of such identification data associated with each lawful occupant of the property that may be stored in robotic device's 280, 282 local memory. Alternatively, or in addition, the robotic device 280, 282 may transmit the biometric data, facial recognition scan, voiceprint, or the like to a monitor control unit 210 via a communication link 284, or some other network. The monitor control unit 210 may connect to an operator, local law enforcement, federal law enforcement database, and/or the like in order to search one or multiple databases in an attempt to identify the burglar 140a. Local and/or federal authorities may then be notified in the event a match is found.

If it is determined 940 that a human body identified during scanning 930 is not a menacing intruder, and instead a lawful occupant of the property such as, property 101, the robotic device 280, 282 may stop tracking the human body. Alternatively, if it is determined 940 that the human body is a menacing intruder, the robotic device 280, 282 may utilize one or more tools at its disposable to reduce the threat posed by the menacing intruder.

At 950, the robotic device 280, 282 may determine 950 based on the received command and real time data associated with the alarm event location an optimal way to reduce the threat posed by the menacing intruder. For instance, the robotic device 280, 282 may determine to decrease, or increase, the aggressiveness of the assigned security strategy based on data detected by the robotic device 280, 282 in real-time.

In some implementations, the robotic device 280, 282 may utilize onboard sensors, detectors, cameras, or the like to assess the real-time status of an alarm event. For instance, though an alarm event notification may provide an indication of a severe threat, one or more menacing intruders may be fleeing by the time the robotic device 280, 282 arrives. Alternatively, the menacing intruder may have decided to flee after the robotic device 280, 282 arrived, and completed the identification scan. Accordingly, though the received command may have indicated a more aggressive active engagement, confrontation, based security strategy, the robotic device 280, 282 may determine to employ a deterrent based security strategy, or no security strategy at all, if the menacing intruder has truly fled.

Similarly, there may be situations where the robotic device 280, 282 may increase the aggressiveness of a security strategy from a deterrent based security strategy to an active engagement, or confrontation, based security strategy. For instance, the command to the robotic device 280, 282 may have indicated that a single person was merely jostling a window. However, when the robotic device 280, 282 arrived, there may be five persons standing inside the house with weapons, and the robotic device's 280, 282 facial recognition scan may indicate that each of the five persons are menacing intruders. In such instances, the robotic device 280, 282 may actively engage the menacing intruders by utilizing the full scope of the robotic device's capabilities up to, and including, use of a taser 114. In such instances, a robotic device 280, 282 may request additional help from a monitor control unit 210. Alternatively, or in addition, for example, the robotic device 280, 282 may directly contact another one or more other robotic devices 280, 282 to ask the one or more other robotic devices to assist with dispatching the threat posed by the menacing intruders.

The robotic device 280, 282 may update 960 the monitor control unit regarding the status of the threat. The update 960 may be transmitted either before, after, and/or during the robotic device's encounter with the menacing intruder at the sensor 220 location. The update 960 may include the same, or substantially similar, data that may be communicated in an alarm event notification, as described hereinabove.

Figure 10:
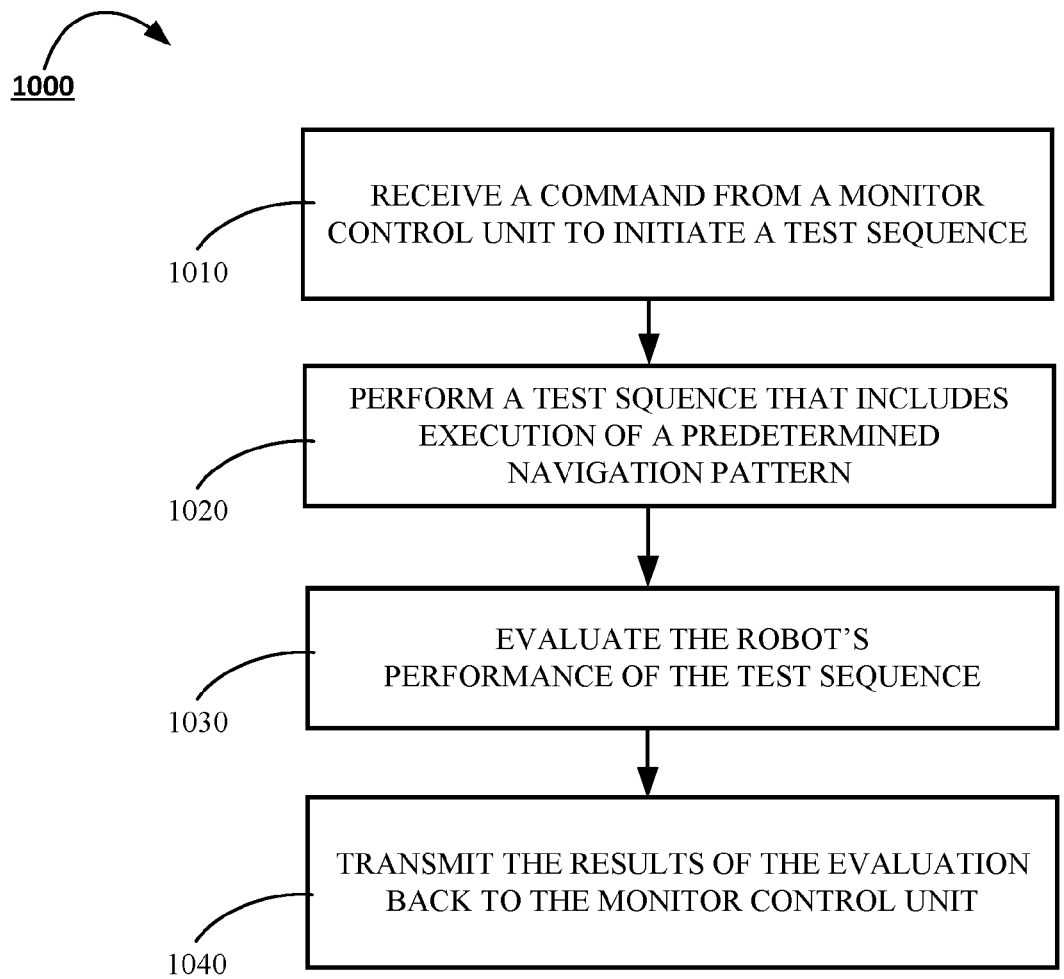
FIG. 10 is a flowchart of an example of a process for testing robotic device functionality.

FIG. 10 is a flowchart of an example of a process 1000 for testing robotic device 280, 282 functionality.

The process 1000 may begin at 1010 with receipt of a command from a monitor control unit 210. The command from the monitor control unit 210 may request initiation of a test sequence for one or more robotic devices 280, 282. The monitor control unit 210 may be configured to initiate a test sequence during predetermined time periods of a day when each of the occupants of a property will not be physically present at the property. Such a predetermined time may be known in advance. Alternatively, the monitor control unit 210 may analyze data that is broadcast, or not broadcast, from one or more sensors 220. In such instances, the monitor control unit 210 may determine from the data provided, or not provided, by sensors 220 whether one or more lawful occupants of the property are present, or not present. In cases where the monitor control unit 210 determines that the lawful occupants of the property are not present, the monitor control unit 210 may initiate a test sequence. Alternatively, the monitor control unit 210 may request initiation of a test sequence in response to a command from a property occupant 150.

Performance 1020 of the test sequence may result in one or more robotic devices 280, 282 retrieving, and executing, a predetermined navigation pattern. The navigation pattern associated with each robotic device 280, 282 may be a navigation pattern that has been learned, and stored, as described in process 700. Alternatively, the navigation pattern may be a predetermined test sequence designed by the entity that provided the security monitoring system 100.

Each robotic device 280, 282 may evaluate 1030 the robotic device's 280, 282 performance during the test sequence. For instance, the robotic device's actual navigation pattern may be compared against the predetermined navigation pattern. Then, a performance error may be calculated based on the deviation in the two navigation patterns. A report may be generated that summarizes each robotic device's 280, 282 performance during the test sequence. The report may be transmitted 1040 to the monitor control unit 210, or the mobile device 152 of the property occupant 150. Adjustments may be made to the navigation pattern of one or more robotic devices 280, 282 based on the returned results of the test sequence.

Other aspects of the robotic device's 280, 282 performance during the test sequence may be evaluated. For instance, a robotic device 280, 282 may report whether the robotic device's 280, 282 camera turned on when the robotic device 280, 282 reached its intended destination. Alternatively, or in addition, the robotic device 280, 282 may report whether the robotic device's 280, 282 audio output speaker played audio signals when the robotic device 280, 282 reached its intended destination. Alternatively, or in addition, the robotic device 280, 282 may report whether the robotic device's 280, 282 taser fired when the robotic device 280, 282 reached its intended destination. Alternatively, or in addition, the robotic devices 280, 282 may report whether a complete scan of the property 101 was obtained based on the navigation patterns executed during a particular test sequence. Yet, other tests may be executed by the robotic device 280, 282. Such results may be similarly be reported 1040, and necessary adjustments made, to improve the security, monitoring, and surveillance methods employed by the robotic device's 280, 282 navigation patterns.

Alternatively, the monitor control unit 210 may evaluate each robotic device's 280, 282 performance during the test sequence. For instance, monitor control unit 210 may compare the robotic device's actual navigation pattern against the predetermined navigation pattern. The monitor control unit 210 may be able to determine the extent a robotic device's 280, 282 actual navigation path has deviated from a predetermined navigation path based on location data transmitted by the robotic device 280, 282 to the monitor control unit 210. The monitor control unit 210 may be able to evaluate other aspects of the robotic device's performance of the test sequence based on sensor data transmitted to the monitor control unit 210 from the robotic device 280, 282. Adjustments to the navigation patterns of one or more robotic devices 280, 282 may be made based on the monitor control unit's 210 evaluations.

Figure 11:
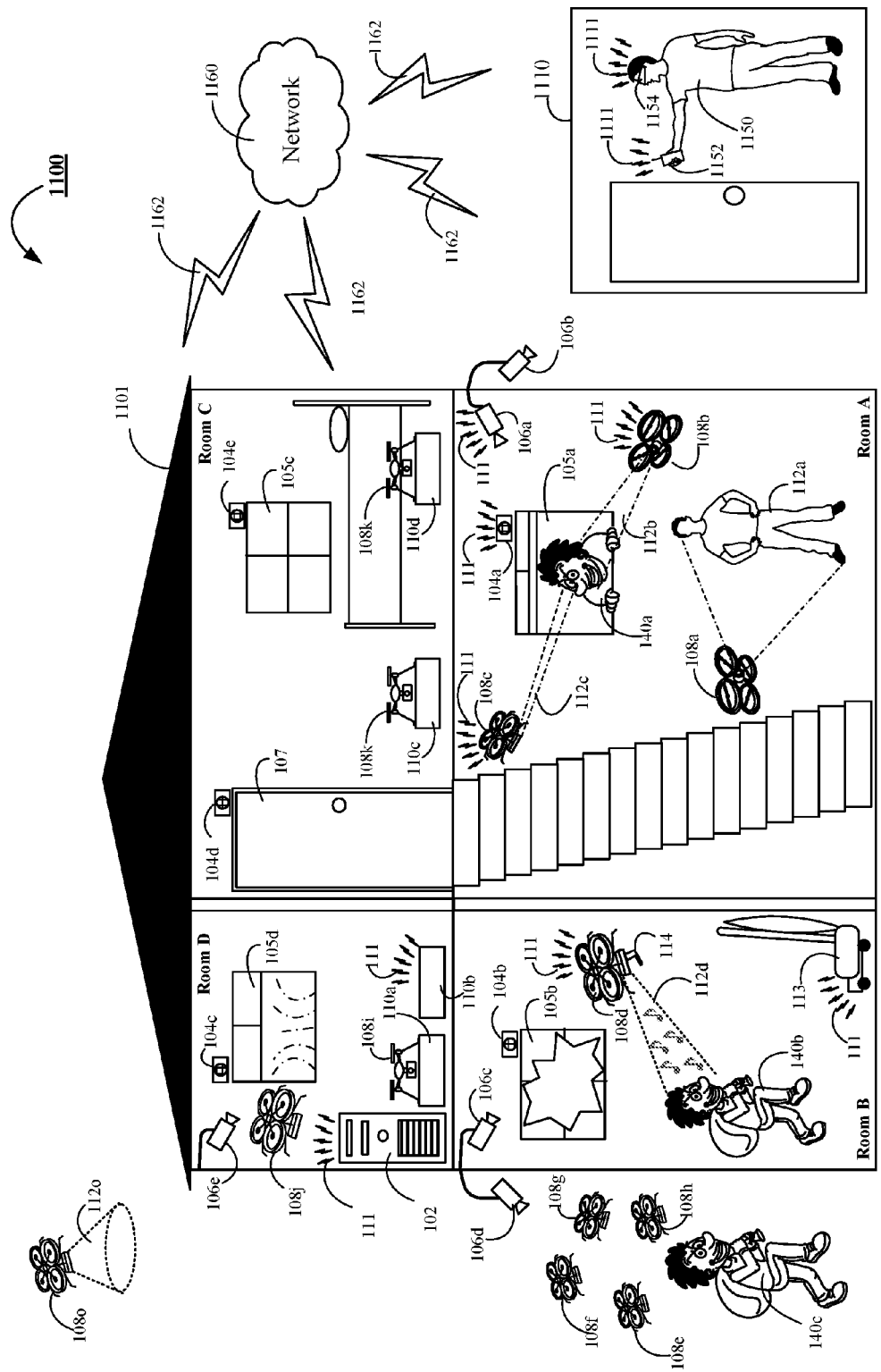
FIG. 11 is a contextual diagram showing features of an example of a remote user interacting with a security monitoring system that may utilize one or more robotic devices.

FIG. 11 is a contextual diagram showing features of an example of a remote user 1150 interacting with a security monitoring system 1100 that may utilize one or more robotic devices 108a, 108b, . . . 108o.

The security monitoring system 1100 may be used to monitor, surveil, and protect property 1101 in the same, or substantially similar, manner as the security monitoring system 100 may be used to monitor, surveil, and protect property 101. For instance, the central monitor control unit 102, multiple sensors 104a, 104b, . . . 104e, cameras 106a, 106b, . . . 106e, robotic device 108a, 108b, . . . 108o, and charging station 110a, 110b, . . . 110d of system 1100 may function in the same, or substantially similar, manner as described with respect to the security monitoring system 100.

System 1100 is different in at least one respect from system 100. For instance, system 1100 may facilitate access to one or more of the central monitor control unit 102, multiple sensors 104a, 104b, . . . 104e, cameras 106a, 106b, . . . 106e, robotic device 108a, 108b, . . . 108o, and/or a charging station 110a, 110b, . . . 110d by a user 1150 who resides at a remote location 1110. The remote user 1150 may be a central station operator, a law enforcement officer, or a lawful occupant of property 1101 who may be at work, on vacation, or the like. Other types of users may also be able to access components of system 1101 in the same, or substantially similar, manner as remote user 1150.

For instance, a remote user 1150 may be able to utilize a mobile application running on a mobile device 1152 to submit a request to access one or more components of system 1100. Alternatively, a user 1150 may use a different type of application, on a different type of computer to submit the request. For example, a user 1150 may submit the request via a browser running on a desktop, laptop, tablet, or the like. The request may be directed to the central monitor control unit 102 via a network 1160. A local network 1111 and one or more wired or wireless communications links 1162 may be utilized in order to connect the mobile device 1152 to the network 1160 and network 111 that hosts the central monitor control unit 102. The network 1160 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 1160 may include multiple networks or subnetworks, each of which may include, for example, a wired or wireless data pathway. The network 1160 may include a circuit-switched network, a packet-switched data network, or any other network able to carry electronic communications (e.g., data or voice communications). For example, the network 1160 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 1160 may include one or more networks that include wireless data channels and wireless voice channels. The network 1160 may be a wireless network, a broadband network, or a combination of networks including a wireless network and a broadband network.

In one aspect, the mobile application may require user authentication prior to providing the user with access to one or more components of system 1100. For instance, when the user 1150 is a lawful occupant of the property 1101, the mobile application may merely require the user to enter authenticating credentials for the user's account. In one implementation, the authentication credentials may include a username and password. Other types of authentication procedures may also be employed to prevent unauthorized access to security monitoring system 1101 by a remote user 1150. For instance, a user may be required to utilize one or more types of biometric data such as, for example, a fingerprint scan, a retina scan, or a facial recognition scan prior to using a mobile application running on a mobile device 1152 to access the security monitoring system 1100. Alternatively, or in addition, a user may be required to enter a dynamically changing personal identification number that is generated by a personal identification number generation unit in the possession of the user. Such a dynamically changing personal identification number may be provided in addition to a user name and password, and must match a corresponding dynamically changing identifier generated by the system 1100 before the system 1100 will grant access to the user.

Other users may request authorization to access one or more components of security monitoring system 1100 that are not lawful occupants of the property 1101. Such users may have to satisfy one or more additional layers of authentication screening. For instance, in addition to input of a username and password, biometric data, and/or a dynamically changing personal identification number, users who are not lawful occupants of the property 1101 may need to seek permission to access one or more components of system 1100 from a lawful occupant of property 1101. Such permission may be granted without restriction by the lawful occupant of property 1101. Alternatively, such access may be conditionally granted by the lawful occupant of property 1101. For instance, a lawful occupant of property 1101 may indicate that the central operator, law enforcement officer, and/or other user may access one portion of the property such as, for example the living room, but not, for example the bedroom. Such an additional layer of authentication for users such as central operators and/or law enforcement officers, who are not lawful occupants of the property, may be implemented to protect the privacy of the lawful occupants of the property 1101 that may reside within the property 1101.

In one implementation, a user 1150 may be able to receive alarm event notifications via the user's 1150 mobile device 1152. In response to such an alarm event notification, and once fully authenticated, the remote user 1150 may use a mobile application running on the mobile device 1152 to request access to a video feed from a particular camera such as camera 106a, 106b, 106c, 106d, 106e. The video feed may be streamed to the user's 1150 virtual reality headset 1154. The user 1150 may be able to control one or more of the cameras 106a, 106b, 106c, 106d, 106e to alter the field of view one or more of the cameras using the mobile device 1152. Thus, the user 1152 may be able to monitor a home invasion, as it occurs in real-time. In some instances, alarm event notifications may be triggered accidentally, and there may not be any menacing threat present on the property 1101. In such instances, a user 1150 may access the cameras 106a, 106b, 106c, 106d, 106e to confirm that there is not an impending threat, and inform the central operator and/or local law enforcement to not travel to the property 1101.

Alternatively, or in addition, once authenticated, a user 1150 may submit a request via mobile application running on mobile device 1152 to take control of one or more robotic devices 108a, 108b, . . . 108o. The user may be able to stream the video feed from one or more robotic devices to the virtual reality headset 1154, and/or control the flight path of at least one robotic device using the mobile device 1152. Alternatively, the user may allow each robotic device to maintain full autonomous control of the robotic device's flight path. In such instances, the user merely monitor the video feeds from one or more deployed robotic devices 108a, 108b, . . . 108o, and even switch back and forth between video feeds of different robotic devices.

A user 1150 may use a mobile application running on mobile device 1152 to submit a command to one or more of the robotic devices 108a, 108b, . . . 108o. For instance, a user 1150 may submit a command that instructs robotic device 108j to fly to Room A. Alternatively, or in addition, for example, a user 1150 may instruct a robotic device 108a to project a hologram 112a that may distract, or frighten away, a burglar 140a. Alternatively, or in addition, a user 1150 transmit an audio message 112d through a robotic device's 108d output speakers as a warning to the burglar 140b. Alternatively, or in addition, a user 1150 may instruct a robotic device 108d to deploy more serious preventive measure such as a blinding light, extremely loud music, and even instruct a robotic device 108d to use a taser 114 to tase an intruder 140b. There may be other commands that a user may submit to one or more robotic devices 108a, 108b, . . . 108o. For example, a user 1150 may use the mobile application on mobile device 1152 to select a set of multiple drones 108e, 108f, 108g, 108h, and instruct the set of multiple drones to swarm a burglar 140c. Alternatively, or in addition, a user 1150 may submit a command that instructs all the deployed robotic devices to return to a charging station 110a, 110b, . . . 110d. Such a command may be submitted by a user 1150 in response to the determination that the alarm event notification was merely a false alarm, and no threat to the property 1101 exists.

Figure 12:
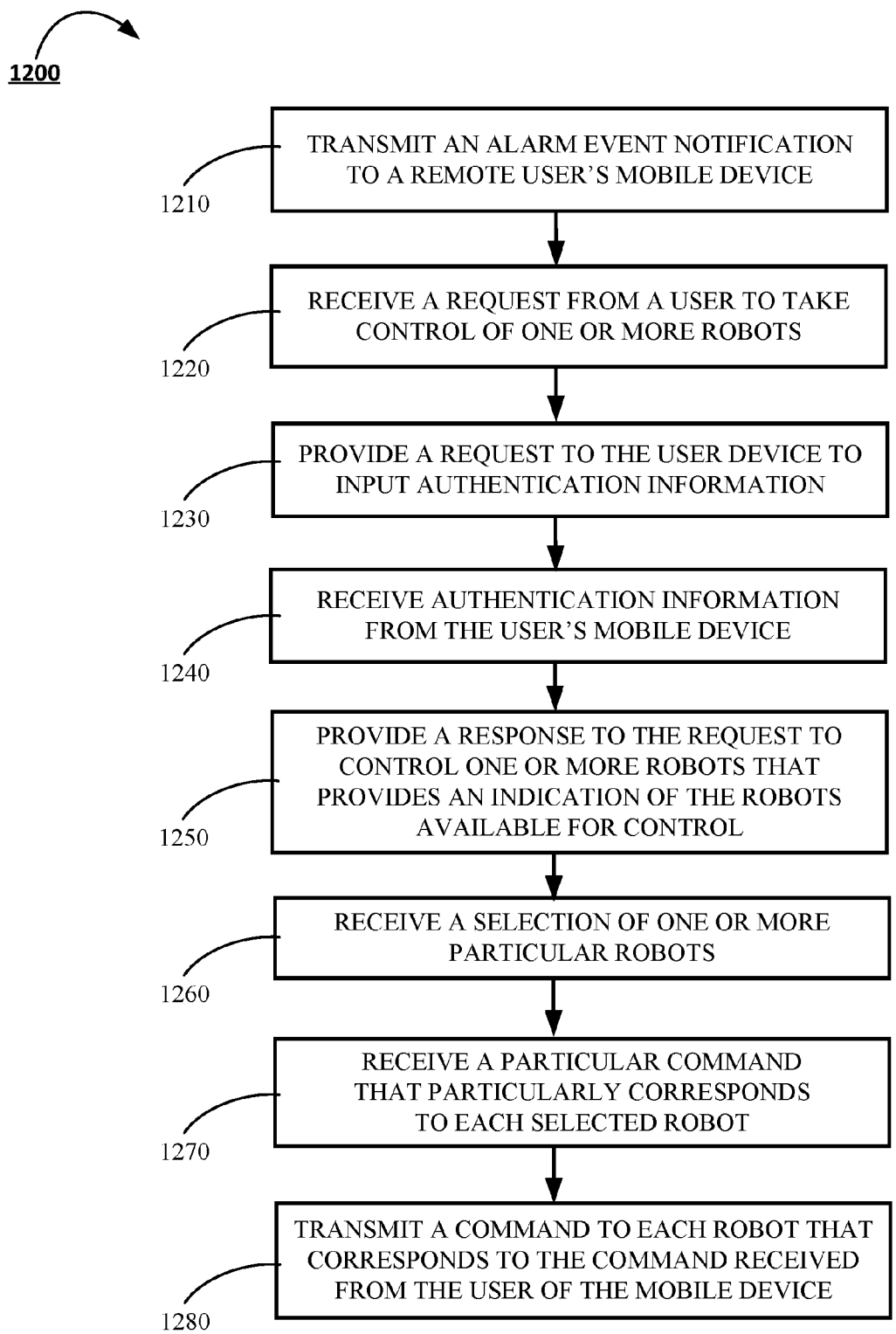
FIG. 12 is a flowchart of an example of a process that facilitates remote user interaction with a security monitoring system utilizing one or more robotic devices.

FIG. 12 is a flowchart of an example of a process 1200 that facilitates remote user 1150 interaction with a security monitoring system 1100 utilizing one or more robotic devices 108a, 108b, . . . 108o.

The process 1200 may being at 1210 when the central monitor control unit 102 transmits an alarm event notification through network 1160 to the user's 1150 mobile device 1152. The transmission of the alarm event notification may include, for example, the central monitor control unit 102 forwarding an alarm event notification that was broadcast by a sensor such as, for example, sensor 104a, 104b, . . . 104e. The user 1150 may submit a request to take control of one or more robotic devices 108a, 108b, . . . 108o that is received 1220 by the central monitor control unit 102.

The central monitor control unit 102 may implement a firewall, and/or other security measures that may prohibit outside devices from gaining unauthorized access to security monitoring system 1100. For instance, the central monitor control unit 102 may provide 1230 a request to the user to input authentication information before providing a user 1150 access to one or more robotic devices 108a, 108b, . . . 108o. In some implementations, the user 1150 may need to only provide a username and password in order to be authenticated. Alternatively, a user 1150 may also be required to provide one or more types of biometric data, a dynamically generated personal identification number, or the like in response to a request for authentication information. However, in some instances, additional measures may need to be taken before a user 1150 is fully authenticated. For instance, if the user 1150 is an operator, law enforcement officer, or any user that is not a lawful occupant of property 1101, the user 1150 may also seek the approval of a lawful occupant of the property 1101. Such approval may be sought by the operator, law enforcement officer, or the like sending a request for permission to access the security monitoring system 1100 to the mobile device utilized by a lawful occupant of the property. The lawful occupant of the property may accept, or deny, access to the third party operator, law enforcement operator, or the like.

Once the central monitor control unit 102 receives 1240 the user's 1150 authentication information, and fully authenticates the user 1150, the central monitor control unit 102 may provide 1250 a response to the user's 1150 request to control one or more robotic devices 108a, 108b, . . . 108o. The response may include, for example, a graphical display of each robotic device 108a, 108b, . . . 108o that may be available for selection. Alternatively, or in addition, the graphical display may also include additional information about each robotic device. For instance, the graphical display may provide, for each robotic device, the tools that the robotic device is equipped with, the current location of the robotic device, the proximity of the robotic device to the sensor 104a, 104b, . . . 104e that detected the alarm event, or the like.

The user may input a selection of one or more robotic devices 108a, 108b, . . . 108o that is transmitted to, and received 1260 by, the central monitor control unit 102. Next, the user 1150 may input a particular command that is to be performed by each selected robotic device. For instance, a user may select one or more commands that may include, for example, "view camera feed," "fly to Room A," "flash bright light," "fire taser," or the like. After the user 1150 selects one more commands, the user device 1152 may transmit the selected commands to the central monitor control unit 102. The central monitor control unit 102 may receive each selected command, and associate the selected command with the corresponding robotic device that is to perform the command. The process may conclude with the central monitor control unit 1280 transmitting each command to the corresponding robotic device 108a, 108b, . . . 108o, respectively. Each respective robotic device may execute the received commands, stream video to the user's 1150 virtual reality headset 1154, and/or the like as indicated by the commands received from user 1150.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system, comprising:
   one or more robotic devices;
   a plurality of sensors located at different locations throughout a property;
   one or more charging stations; and
   a monitor control unit, wherein the monitor control unit includes:
      a network interface;
      one or more processors; and
      one or more storage devices that include instructions that are operable, when executed by the one or more processors, to cause the one or more processors to perform operations comprising:
         detecting an initial event based on data received from one or more of the plurality of sensors;
         determining a location of one or more sensors of the plurality of sensors that has broadcasted data indicative of an event;
         determining a time of day;
         determining a number of moving objects detected by one or more of the plurality of sensors at a time of assessment of the initial event, the determination of the number of moving objects being different than the detection of the initial event;
         determining an amount of time that the monitor control unit has been detecting subsequent events since the detection of the initial event;
         determining whether the monitoring system has been in a state of responding to the initial event and the subsequent events for a threshold period of time based on the amount of time that the monitor control unit has been detecting subsequent events since the detection of the initial event;
         determining, from among multiple security strategies for engaging a suspected intruder with the one or more robotic devices, a particular security strategy for engaging a suspected intruder based on an evaluation of multiple factors including the data received from the one or more sensors, the determined time of day, the determined number of moving objects, and the determination of whether the monitoring system has been in a state of responding to the initial event and the subsequent events for a threshold period of time;
         accessing information describing the capabilities of each of the one or more robotic devices;
         selecting one or more of the robotic devices based on the particular security strategy; and
         transmitting a command to the one or more robotic devices that instructs each respective robotic device to navigate to one or more of the determined locations of the property to attempt to engage a suspected intruder based on the particular security strategy.

2. The system of claim 1, wherein each robotic device of the one or more robotic devices is a quad-copter drone.

3. The system of claim 1, wherein the one or more robotic devices includes at least one of a helicopter drone, a rolling helicopter drone, or a land vehicle device.

4. The system of claim 1, the operations further comprising:
receiving a communication from one or more of the selected robotic devices that provides a real-time update regarding the status of one or more of the detected events.

5. The system of claim 1, wherein determining, from among multiple security strategies for engaging a suspected intruder with one or more robotic devices, a particular security strategy for engaging a suspected intruder further comprises:
selecting either a deterrence based security strategy or a confrontation based security strategy.

6. The system of claim 1, the operations further comprising:
determining that the number of moving objects exceeds a predetermined threshold; and
in response to determining that the number of moving objects exceeds a predetermined threshold, selecting a confrontation based security strategy.

7. The system of claim 1, the operations further comprising:
determining that the number of moving objects falls below a predetermined threshold; and
in response to determining that the number of moving objects falls below a predetermined threshold, selecting a deterrence based security strategy.

8. The system of claim 1, the operations further comprising:
determining that a deterrence based strategy should be utilized based on the data received from one or more sensors of the plurality of sensors; and
in response to determining that a deterrence based strategy should be utilized, selecting one or more of the robotic devices that are equipped to deter a person from entering into a building on the property.

9. The system of claim 8, wherein robotic devices equipped to deter a person from entering the property include robotic devices that are equipped with one or more of a biometric reader, a facial recognition camera, or a holographic projector.

10. The system of claim 1, the operations further comprising:
determining that a confrontation based strategy should be utilized based on the data received from one or more sensors of the plurality of sensors; and
in response to determining that a confrontation based strategy should be utilized, selecting one or more of the robotic devices that are equipped to confront a person.

11. The system of claim 10, wherein robotic devices equipped to confront a person include robotic devices that are equipped with one or more of an audio output device, a bright light, or a taser.

12. The system of claim 1, the operations further comprising:
determining the current location of two or more of the robotic devices;
selecting a particular robotic device of the two or more robotic devices that is currently nearest in proximity to a particular sensor of the one or more sensors that has broadcasted data indicative of an event; and,
deploying the particular robotic device to a location that is associated with the particular sensor.

13. The system of claim 1, wherein determining the location of one or more sensors of the plurality of sensors includes:
obtaining a sensor identifier from a particular sensor of the one or more sensors;
accessing a set of information associated with each of the plurality of sensors; and
obtaining, from the set of information associated each of the plurality of sensors, the location information that corresponds to the received sensor identifier.

14. The system of claim 1, the operations further comprising:
determining whether one or more of the robotic devices have a current battery level that exceeds a predetermined battery level threshold; and
selecting at least one robotic device based, at least in part, on the determination that the at least one robotic device has a current battery level that satisfies the predetermined threshold.

15. The system of claim 1, the operations further comprising:
determining that the current battery level of at least one deployed robotic device has fallen below a predetermined battery level threshold; and
transmitting an instruction to the at least one deployed robotic device that instructs the at least one deployed robotic device to return to a particular wireless charging station that was identified based on location and occupancy status.

16. The system of claim 1, wherein each of the one or more robotic devices are configured to function only within a predetermined distance of a property where the central monitor control unit resides.

17. The system of claim 1, wherein the command also includes a particular action that each respective robotic device is to perform.

18. The system of claim 1, wherein the command includes an instruction to navigate according to a predetermined flight path.

* * * * *